(12) United States Patent
Boylan et al.

(10) Patent No.: US 7,523,189 B2
(45) Date of Patent: *Apr. 21, 2009

(54) METHODS AND COMPUTER READABLE MEDIA FOR GENERATING DISPLAYS OF USER-DEFINED BLOCKS OF NETWORKING ADDRESSES

(75) Inventors: Dennis Joseph Boylan, Norcross, GA (US); Kenneth Douglas Burroughs, Memphis, TN (US); Sean Ming Drun, Lilburn, GA (US); John Leland Lee, Roswell, GA (US); Angela Kristine Schneider, Germantown, TN (US)

(73) Assignee: Internet Associates, LLC, Union City, GA (US)

( * ) Notice: Subject to any disclaimer, the term of this patent is extended or adjusted under 35 U.S.C. 154(b) by 147 days.

This patent is subject to a terminal disclaimer.

(21) Appl. No.: 11/519,571

(22) Filed: Sep. 12, 2006

(65) Prior Publication Data

US 2007/0011297 A1 Jan. 11, 2007

Related U.S. Application Data

(63) Continuation of application No. 10/642,475, filed on Aug. 15, 2003, now Pat. No. 7,127,505.

(51) Int. Cl.
*G06F 15/173* (2006.01)
*G06F 3/00* (2006.01)

(52) U.S. Cl. ............. 709/223; 345/589; 345/612; 345/613; 345/614; 345/626; 345/563; 345/564; 345/594; 345/597; 345/598; 345/599; 345/619; 345/627; 345/628; 345/629; 345/653; 345/654; 345/655; 345/686; 340/3.1; 340/3.5; 340/3.52; 711/209; 715/700; 715/711; 715/713; 715/735; 715/736; 715/737; 715/738; 715/747; 715/853; 715/859

(58) Field of Classification Search ......... 715/700, 715/711, 713, 735, 736, 737, 738, 747, 853, 715/859; 345/589, 613, 614, 612, 626, 563, 345/564, 699, 594, 597, 598, 599, 619, 627, 345/628, 629, 653, 654, 655, 686, 689, 440, 345/440.1, 440.2; 340/3.1, 3.5, 3.52; 711/209
See application file for complete search history.

(56) References Cited

U.S. PATENT DOCUMENTS 6,404,444 B1 * 6/2002 Johnston et al. .......... 715/839
2004/0070632 A1 * 4/2004 Wilkes .................... 345/850

* cited by examiner

*Primary Examiner*—Ashok B Patel
(74) *Attorney, Agent, or Firm*—Hope Baldauff Hartman, LLC

(57) ABSTRACT

Methods and computer readable media for generating displays of user-defined blocks of networking addresses on a map of an associated address space are provided. Each block of networking addresses is described in a user-defined table with a start address and a map size. The display for each block of network addresses may be rendered on the map at a location based on the relative position of the start address within the associated address space and of a size based on the mask size in relation to the associated address space.

16 Claims, 35 Drawing Sheets

|      | 0000 | 0001 | 0010 | 0011 | 0100 | 0101 | 0110 | 0111 | 1000 | 1001 | 1010 | 1011 | 1100 | 1101 | 1110 | 1111 |
|------|------|------|------|------|------|------|------|------|------|------|------|------|------|------|------|------|
| 0000 | 0    | 1    | 2    | 3    | 4    | 5    | 6    | 7    | 8    | 9    | 10   | 11   | 12   | 13   | 14   | 15   |
| 0001 | 16   | 17   | 18   | 19   | 20   | 21   | 22   | 23   | 24   | 25   | 26   | 27   | 28   | 29   | 30   | 31   |
| 0010 | 32   | 33   | 34   | 35   | 36   | 37   | 38   | 39   | 40   | 41   | 42   | 43   | 44   | 45   | 46   | 47   |
| 0011 | 48   | 49   | 50   | 51   | 52   | 53   | 54   | 55   | 56   | 57   | 58   | 59   | 60   | 61   | 62   | 63   |
| 0100 | 64   | 65   | 66   | 67   | 68   | 69   | 70   | 71   | 72   | 73   | 74   | 75   | 76   | 77   | 78   | 79   |
| 0101 | 80   | 81   | 82   | 83   | 84   | 85   | 86   | 87   | 88   | 89   | 90   | 91   | 92   | 93   | 94   | 95   |
| 0110 | 96   | 97   | 98   | 99   | 100  | 101  | 102  | 103  | 104  | 105  | 106  | 107  | 108  | 109  | 110  | 111  |
| 0111 | 112  | 113  | 114  | 115  | 116  | 117  | 118  | 119  | 120  | 121  | 122  | 123  | 124  | 125  | 126  | 127  |
| 1000 | 128  | 129  | 130  | 131  | 132  | 133  | 134  | 135  | 136  | 137  | 138  | 139  | 140  | 141  | 142  | 143  |
| 1001 | 144  | 145  | 146  | 147  | 148  | 149  | 150  | 151  | 152  | 153  | 154  | 155  | 156  | 157  | 158  | 159  |
| 1010 | 160  | 161  | 162  | 163  | 164  | 165  | 166  | 167  | 168  | 169  | 170  | 171  | 172  | 173  | 174  | 175  |
| 1011 | 176  | 177  | 178  | 179  | 180  | 181  | 182  | 183  | 184  | 185  | 186  | 187  | 188  | 189  | 190  | 191  |
| 1100 | 192  | 193  | 194  | 195  | 196  | 197  | 198  | 199  | 200  | 201  | 202  | 203  | 204  | 205  | 206  | 207  |
| 1101 | 208  | 209  | 210  | 211  | 212  | 213  | 214  | 215  | 216  | 217  | 218  | 219  | 220  | 221  | 222  | 223  |
| 1110 | 224  | 225  | 226  | 227  | 228  | 229  | 230  | 231  | 232  | 233  | 234  | 235  | 236  | 237  | 238  | 239  |
| 1111 | 240  | 241  | 242  | 243  | 244  | 245  | 246  | 247  | 248  | 249  | 250  | 251  | 252  | 253  | 254  | 255  |

| Start Address | Mask | Size | Status | Location | Location | Parent | Type |
|---|---|---|---|---|---|---|---|
| 192.168.120.64 | 26 | 64 | Allocated | Engineering | Acme | None | IPv4 |
| 10.10.10.0 | 24 | 256 | Allocated | Lab | Headquarters | Acme | IPv4 |
| 192.168.120.0 | 26 | 64 | Allocated | Headquarters | Accounting | Acme | IPv4 |
| 192.168.120.144 | 28 | 16 | Free | Acme | Engineering | Acme | IPv4 |
| 192.168.120.208 | 28 | 16 | Free | Acme | Sales | Acme | IPv4 |
| 192.168.120.224 | 30 | 4 | Allocated | Acme | Lab | Engineering | IPv4 |
| 192.168.120.228 | 30 | 4 | Free | Acme | Sales East | Sales | IPv4 |
| 192.168.120.232 | 29 | 8 | Free | Acme | Sales West | Sales | IPv4 |
| 192.168.120.240 | 28 | 16 | Free | Acme | | | |
| 192.168.120.128 | 29 | 8 | Allocated | Accounting | | | |
| 192.168.120.136 | 29 | 8 | Free | Accounting | | | |
| 192.168.120.160 | 29 | 8 | Allocated | Sales | | | |
| 192.168.120.168 | 31 | 2 | Allocated | Sales | | | |
| 192.168.120.170 | 31 | 2 | Free | Sales | | | |
| 192.168.120.172 | 30 | 4 | Allocated | Sales | | | |
| 192.168.120.176 | 29 | 8 | Allocated | Sales East | | | |
| 192.168.120.184 | 29 | 8 | Free | Sales East | | | |
| 192.168.120.192 | 29 | 8 | Allocated | Sales West | | | |
| 192.168.120.200 | 29 | 8 | Free | Sales West | | | |

Table 1

FIG. 26

| Start Address | Mask | Size | Status | Location | Location | Parent | Type |
|---|---|---|---|---|---|---|---|
| 192.168.120.64 | 26 | 64 | Allocated | Engineering | Acme | None | IPv4 |
| 10.10.10.0 | 24 | 256 | Allocated | Lab | Headquarters | Acme | IPv4 |
| 192.168.120.0 | 26 | 64 | Allocated | Headquarters | Accounting | Acme | IPv4 |
| 192.168.120.144 | 28 | 16 | Free | Acme | Engineering | Acme | IPv4 |
| 192.168.120.208 | 28 | 16 | Free | Acme | Sales | Acme | IPv4 |
| 192.168.120.224 | 30 | 4 | Allocated | Acme | Lab | Engineering | IPv4 |
| 192.168.120.228 | 30 | 4 | Free | Acme | Sales East | Sales | IPv4 |
| 192.168.120.232 | 29 | 8 | Free | Acme | Sales West | Sales | IPv4 |
| 192.168.120.240 | 28 | 16 | Free | Acme | Core | None | IPv6 |
| 192.168.120.128 | 29 | 8 | Allocated | Accounting | Sol | Core | IPv6 |
| 192.168.120.136 | 29 | 8 | Free | Accounting | Earth | Sol | IPv6 |
| 192.168.120.160 | 29 | 8 | Allocated | Sales | Canis Major | Core | IPv6 |
| 192.168.120.168 | 31 | 2 | Allocated | Sales | Sirius | Canis Major | IPv6 |
| 192.168.120.170 | 31 | 2 | Free | Sales | Colony | Sirius | IPv6 |
| 192.168.120.172 | 30 | 4 | Allocated | Sales | Murzim | Canis Major | IPv6 |
| 192.168.120.176 | 29 | 8 | Allocated | Sales East | Muliphen | Canis Major | IPv6 |
| 192.168.120.184 | 29 | 8 | Free | Sales East | | | |
| 192.168.120.192 | 29 | 8 | Allocated | Sales West | | | |
| 192.168.120.200 | 29 | 8 | Free | Sales West | | | |
| fe80::0 | 103 | 33,554,432 | Allocated | Earth | | | |
| fe80::200:0 | 104 | 16,777,216 | Allocated | Colony | | | |
| fe80::300:0 | 104 | 16,777,216 | Free | Core | | | |
| fe80::400:0 | 102 | 67,108,864 | Free | Core | | | |
| fe80::800:0 | 101 | 134,217,728 | Free | Core | | | |
| fe80::1000:0 | 100 | 268,435,456 | Free | Core | | | |
| fe80::2000:0 | 99 | 536,870,912 | Free | Core | | | |
| fe80::4000:0 | 98 | 1,073,741,824 | Free | Core | | | |
| fe80::8000:0 | 97 | 2,147,483,648 | Free | Core | | | |
| fe80::1:0:0 | 96 | 4,294,967,296 | Free | Core | | | |
| fe80::2:0:0 | 95 | 8,589,934,592 | Free | Core | | | |
| fe80::4:0:0 | 94 | 17,179,869,184 | Free | Core | | | |
| fe80::8:0:0 | 93 | 34,359,738,368 | Free | Core | | | |
| fe80::10:0:0 | 92 | 68,719,476,736 | Free | Core | | | |
| fe80::20:0:0 | 91 | 137,438,953,472 | Free | Core | | | |
| fe80::40:0:0 | 90 | 274,877,906,944 | Free | Core | | | |
| fe80::80:0:0 | 89 | 549,755,813,888 | Free | Core | | | |
| fe80::100:0:0 | 88 | 1,099,511,627,776 | Free | Core | | | |
| fe80::200:0:0 | 87 | 2,199,023,255,552 | Free | Core | | | |
| fe80::400:0:0 | 86 | 4,398,046,511,104 | Free | Core | | | |
| fe80::800:0:0 | 85 | 8,796,093,022,208 | Free | Core | | | |
| fe80::1000:0:0 | 84 | 17,592,186,044,416 | Free | Core | | | |
| fe80::2000:0:0 | 83 | 35,184,372,088,832 | Free | Core | | | |
| fe80::4000:0:0 | 82 | 70,368,744,177,664 | Free | Core | | | |
| fe80::8000:0:0 | 81 | 140,737,488,355,328 | Free | Core | | | |
| fe80::1:0:0:0 | 80 | 281,474,976,710,656 | Free | Core | | | |
| fe80::2:0:0:0 | 79 | 562,949,953,421,312 | Free | Core | | | |

TABLE 2

FIG. 27

| Network | ID | Parent | Address Type | Aggre-gate | Address Blocks | |
|---|---|---|---|---|---|---|
| ⊟ {4} Acme | 1 | 0 | IPv4 | Y | 192.168.120.144 /28 | Free |
| | | | | | 192.168.120.208 /28 | Free |
| | | | | | 192.168.120.224 /30 | Connection |
| | | | | | 192.168.120.228 /30 | Free |
| | | | | | 192.168.120.232 /29 | Free |
| | | | | | 192.168.120.240 /28 | Delegated |
| ├ {4} Accounting | 3 | 1 | IPv4 | Y | 192.168.120.128 /29 | Connection |
| | | | | | 192.168.120.136 /29 | Free |
| ├ {4} Engineering | 4 | 1 | IPv4 | Y | 192.168.120.64 /26 | Connection |
| │  ├ {4} LAB | 5 | 4 | IPv4 | N | 10.10.10.0 /24 | Allocated |
| ├ {4} Headquarters | 2 | 1 | IPv4 | Y | 192.168.120.0 /26 | Connection |
| ├ {4} Manufacturing | 9 | 1 | IPv4 | Y | | |
| │  └ {4} Assembly Line | 10 | 9 | IPv4 | Y | | |
| └ {4} Sales | 6 | 1 | IPv4 | Y | 192.168.120.160 /29 | Connection |
| | | | | | 192.168.120.168 /31 | Connection |
| | | | | | 192.168.120.170 /31 | Free |
| | | | | | 192.168.120.172 /30 | Connection |
| {4} Sales East | 7 | 6 | IPv4 | Y | 192.168.120.176 /29 | Connection |
| | | | | | 192.168.120.184 /29 | Free |
| {4} Sales West | 8 | 6 | IPv4 | Y | 192.168.120.192 /29 | Connection |
| | | | | | 192.168.120.200 /29 | Free |

TABLE 3

FIG. 28

| +0.0 | +1.0 | +2.0 | +3.0 | +4.0 | +5.0 | +6.0 | +7.0 |
|---|---|---|---|---|---|---|---|
| +8.0 | +9.0 | +10.0 | +11.0 | +12.0 | +13.0 | +14.0 | +15.0 |
| +16.0 | +17.0 | +18.0 | +19.0 | +20.0 | +21.0 | +22.0 | +23.0 |
| +24.0 | +25.0 | +26.0 | +27.0 | +28.0 | +29.0 | +30.0 | +31.0 |
| +32.0 | +33.0 | +34.0 | +35.0 | +36.0 | +37.0 | +38.0 | +39.0 |
| +40.0 | +41.0 | +42.0 | +43.0 | +44.0 | +45.0 | +46.0 | +47.0 |
| +48.0 | +49.0 | +50.0 | +51.0 | +52.0 | +53.0 | +54.0 | +55.0 |
| +56.0 | +57.0 | +58.0 | +59.0 | +60.0 | +61.0 | +62.0 | +63.0 |

FIG. 29

| +0 .0 | +0 .64 | +0 .128 | +0 .192 | +1 .0 | +1 .64 | +1 .128 | +1 .192 | +2 .0 | +2 .64 | +2 .128 | +2 .192 | +3 .0 | +3 .64 | +3 .128 | +3 .192 |
|---|---|---|---|---|---|---|---|---|---|---|---|---|---|---|---|
| +4 .0 | +4 .64 | +4 .128 | +4 .192 | +5 .0 | +5 .64 | +5 .128 | +5 .192 | +6 .0 | +6 .64 | +6 .128 | +6 .192 | +7 .0 | +7 .64 | +7 .128 | +7 .192 |
| +8 .0 | +8 .64 | +8 .128 | +8 .192 | +9 .0 | +9 .64 | +9 .128 | +9 .192 | +10 .0 | +10 .64 | +10 .128 | +10 .192 | +11 .0 | +11 .64 | +11 .128 | +11 .192 |
| +12 .0 | +12 .64 | +12 .128 | +12 .192 | +13 .0 | +13 .64 | +13 .128 | +13 .192 | +14 .0 | +14 .64 | +14 .128 | +14 .192 | +15 .0 | +15 .64 | +15 .128 | +15 .192 |
| +16 .0 | +16 .64 | +16 .128 | +16 .192 | +17 .0 | +17 .64 | +17 .128 | +17 .192 | +18 .0 | +18 .64 | +18 .128 | +18 .192 | +19 .0 | +19 .64 | +19 .128 | +19 .192 |
| +20 .0 | +20 .64 | +20 .128 | +20 .192 | +21 .0 | +21 .64 | +21 .128 | +21 .192 | +22 .0 | +22 .64 | +22 .128 | +22 .192 | +23 .0 | +23 .64 | +23 .128 | +23 .192 |
| +24 .0 | +24 .64 | +24 .128 | +24 .192 | +25 .0 | +25 .64 | +25 .128 | +25 .192 | +26 .0 | +26 .64 | +26 .128 | +26 .192 | +27 .0 | +27 .64 | +27 .128 | +27 .192 |
| +28 .0 | +28 .64 | +28 .128 | +28 .192 | +29 .0 | +29 .64 | +29 .128 | +29 .192 | +30 .0 | +30 .64 | +30 .128 | +30 .192 | +31 .0 | +31 .64 | +31 .128 | +31 .192 |
| +32 .0 | +32 .64 | +32 .128 | +32 .192 | +33 .0 | +33 .64 | +33 .128 | +33 .192 | +34 .0 | +34 .64 | +34 .128 | +34 .192 | +35 .0 | +35 .64 | +35 .128 | +35 .192 |
| +36 .0 | +36 .64 | +36 .128 | +36 .192 | +37 .0 | +37 .64 | +37 .128 | +37 .192 | +38 .0 | +38 .64 | +38 .128 | +38 .192 | +39 .0 | +39 .64 | +39 .128 | +39 .192 |
| +40 .0 | +40 .64 | +40 .128 | +40 .192 | +41 .0 | +41 .64 | +41 .128 | +41 .192 | +42 .0 | +42 .64 | +42 .128 | +42 .192 | +43 .0 | +43 .64 | +43 .128 | +43 .192 |
| +44 .0 | +44 .64 | +44 .128 | +44 .192 | +45 .0 | +45 .64 | +45 .128 | +45 .192 | +46 .0 | +46 .64 | +46 .128 | +46 .192 | +47 .0 | +47 .64 | +47 .128 | +47 .192 |
| +48 .0 | +48 .64 | +48 .128 | +48 .192 | +49 .0 | +49 .64 | +49 .128 | +49 .192 | +50 .0 | +50 .64 | +50 .128 | +50 .192 | +51 .0 | +51 .64 | +51 .128 | +51 .192 |
| +52 .0 | +52 .64 | +52 .128 | +52 .192 | +53 .0 | +53 .64 | +53 .128 | +53 .192 | +54 .0 | +54 .64 | +54 .128 | +54 .192 | +55 .0 | +55 .64 | +55 .128 | +55 .192 |
| +56 .0 | +56 .64 | +56 .128 | +56 .192 | +57 .0 | +57 .64 | +57 .128 | +57 .192 | +58 .0 | +58 .64 | +58 .128 | +58 .192 | +59 .0 | +59 .64 | +59 .128 | +59 .192 |
| +60 .0 | +60 .64 | +60 .128 | +60 .192 | +61 .0 | +61 .64 | +61 .128 | +61 .192 | +62 .0 | +62 .64 | +62 .128 | +62 .192 | +63 .0 | +63 .64 | +63 .128 | +63 .192 |

FIG. 30

| +0.0 | +1.0 | +2.0 | +3.0 |
|---|---|---|---|
| +4.0 | +5.0 | +6.0 | +7.0 |
| +8.0 | +9.0 | +10.0 | +11.0 |
| +12.0 | +13.0 | +14.0 | +15.0 |

FIG. 31

| +0.0 | +0 .16 | +0 .32 | +0 .48 | +0 .64 | +0 .80 | +0 .96 | +0 .112 | +0 .128 | +0 .144 | +0 .160 | +0 .176 | +0 .192 | +0 .208 | +0 .224 | +0 .240 |
|---|---|---|---|---|---|---|---|---|---|---|---|---|---|---|---|
| +1.0 | +1 .16 | +1 .32 | +1 .48 | +1 .64 | +1 .80 | +1 .96 | +1 .112 | +1 .128 | +1 .144 | +1 .160 | +1 .176 | +1 .192 | +1 .208 | +1 .224 | +1 .240 |
| +2.0 | +2 .16 | +2 .32 | +2 .48 | +2 .64 | +2 .80 | +2 .96 | +2 .112 | +2 .128 | +2 .144 | +2 .160 | +2 .176 | +2 .192 | +2 .208 | +2 .224 | +2 .240 |
| +3.0 | +3 .16 | +3 .32 | +3 .48 | +3 .64 | +3 .80 | +3 .96 | +3 .112 | +3 .128 | +3 .144 | +3 .160 | +3 .176 | +3 .192 | +3 .208 | +3 .224 | +3 .240 |
| +4.0 | +4 .16 | +4 .32 | +4 .48 | +4 .64 | +4 .80 | +4 .96 | +4 .112 | +4 .128 | +4 .144 | +4 .160 | +4 .176 | +4 .192 | +4 .208 | +4 .224 | +4 .240 |
| +5.0 | +5 .16 | +5 .32 | +5 .48 | +5 .64 | +5 .80 | +5 .96 | +5 .112 | +5 .128 | +5 .144 | +5 .160 | +5 .176 | +5 .192 | +5 .208 | +5 .224 | +5 .240 |
| +6.0 | +6 .16 | +6 .32 | +6 .48 | +6 .64 | +6 .80 | +6 .96 | +6 .112 | +6 .128 | +6 .144 | +6 .160 | +6 .176 | +6 .192 | +6 .208 | +6 .224 | +6 .240 |
| +7.0 | +7 .16 | +7 .32 | +7 .48 | +7 .64 | +7 .80 | +7 .96 | +7 .112 | +7 .128 | +7 .144 | +7 .160 | +7 .176 | +7 .192 | +7 .208 | +7 .224 | +7 .240 |
| +8.0 | +8 .16 | +8 .32 | +8 .48 | +8 .64 | +8 .80 | +8 .96 | +8 .112 | +8 .128 | +8 .144 | +8 .160 | +8 .176 | +8 .192 | +8 .208 | +8 .224 | +8 .240 |
| +9.0 | +9 .16 | +9 .32 | +9 .48 | +9 .64 | +9 .80 | +9 .96 | +9 .112 | +9 .128 | +9 .144 | +9 .160 | +9 .176 | +9 .192 | +9 .208 | +9 .224 | +9 .240 |
| +10 .0 | +10 .16 | +10 .32 | +10 .48 | +10 .64 | +10 .80 | +10 .96 | +10 .112 | +10 .128 | +10 .144 | +10 .160 | +10 .176 | +10 .192 | +10 .208 | +10 .224 | +10 .240 |
| +11 .0 | +11 .16 | +11 .32 | +11 .48 | +11 .64 | +11 .80 | +11 .96 | +11 .112 | +11 .128 | +11 .144 | +11 .160 | +11 .176 | +11 .192 | +11 .208 | +11 .224 | +11 .240 |
| +12 .0 | +12 .16 | +12 .32 | +12 .48 | +12 .64 | +12 .80 | +12 .96 | +12 .112 | +12 .128 | +12 .144 | +12 .160 | +12 .176 | +12 .192 | +12 .208 | +12 .224 | +12 .240 |
| +13 .0 | +13 .16 | +13 .32 | +13 .48 | +13 .64 | +13 .80 | +13 .96 | +13 .112 | +13 .128 | +13 .144 | +13 .160 | +13 .176 | +13 .192 | +13 .208 | +13 .224 | +13 .240 |
| +14 .0 | +14 .16 | +14 .32 | +14 .48 | +14 .64 | +14 .80 | +14 .96 | +14 .112 | +14 .128 | +14 .144 | +14 .160 | +14 .176 | +14 .192 | +14 .208 | +14 .224 | +14 .240 |
| +15 .0 | +15 .16 | +15 .32 | +15 .48 | +15 .64 | +15 .80 | +15 .96 | +15 .112 | +15 .128 | +15 .144 | +15 .160 | +15 .176 | +15 .192 | +15 .208 | +15 .224 | +15 .240 |

FIG. 32

| +0 .0 | +0 .4 | +0 .8 | +0 .12 | +0 .16 | +0 .20 | +0 .24 | +0 .28 | +0 .32 | +0 .36 | +0 .40 | +0 .44 | +0 .48 | +0 .52 | +0 .56 | +0 .60 |
|---|---|---|---|---|---|---|---|---|---|---|---|---|---|---|---|
| +0 .64 | +0 .68 | +0 .72 | +0 .76 | +0 .80 | +0 .84 | +0 .88 | +0 .92 | +0 .96 | +0 .100 | +0 .104 | +0 .108 | +0 .112 | +0 .116 | +0 .120 | +0 .124 |
| +0 .128 | +0 .132 | +0 .136 | +0 .140 | +0 .144 | +0 .148 | +0 .152 | +0 .156 | +0 .160 | +0 .164 | +0 .168 | +0 .172 | +0 .176 | +0 .180 | +0 .184 | +0 .188 |
| +0 .192 | +0 .196 | +0 .200 | +0 .204 | +0 .208 | +0 .212 | +0 .216 | +0 .220 | +0 .224 | +0 .228 | +0 .232 | +0 .236 | +0 .240 | +0 .244 | +0 .248 | +0 .252 |
| +1 .0 | +1 .4 | +1 .8 | +1 .12 | +1 .16 | +1 .20 | +1 .24 | +1 .28 | +1 .32 | +1 .36 | +1 .40 | +1 .44 | +1 .48 | +1 .52 | +1 .56 | +1 .60 |
| +1 .64 | +1 .68 | +1 .72 | +1 .76 | +1 .80 | +1 .84 | +1 .88 | +1 .92 | +1 .96 | +1 .100 | +1 .104 | +1 .108 | +1 .112 | +1 .116 | +1 .120 | +1 .124 |
| +1 .128 | +1 .132 | +1 .136 | +1 .140 | +1 .144 | +1 .148 | +1 .152 | +1 .156 | +1 .160 | +1 .164 | +1 .168 | +1 .172 | +1 .176 | +1 .180 | +1 .184 | +1 .188 |
| +1 .192 | +1 .196 | +1 .200 | +1 .204 | +1 .208 | +1 .212 | +1 .216 | +1 .220 | +1 .224 | +1 .228 | +1 .232 | +1 .236 | +1 .240 | +1 .244 | +1 .248 | +1 .252 |
| +2 .0 | +2 .4 | +2 .8 | +2 .12 | +2 .16 | +2 .20 | +2 .24 | +2 .28 | +2 .32 | +2 .36 | +2 .40 | +2 .44 | +2 .48 | +2 .52 | +2 .56 | +2 .60 |
| +2 .64 | +2 .68 | +2 .72 | +2 .76 | +2 .80 | +2 .84 | +2 .88 | +2 .92 | +2 .96 | +2 .100 | +2 .104 | +2 .108 | +2 .112 | +2 .116 | +2 .120 | +2 .124 |
| +2 .128 | +2 .132 | +2 .136 | +2 .140 | +2 .144 | +2 .148 | +2 .152 | +2 .156 | +2 .160 | +2 .164 | +2 .168 | +2 .172 | +2 .176 | +2 .180 | +2 .184 | +2 .188 |
| +2 .192 | +2 .196 | +2 .200 | +2 .204 | +2 .208 | +2 .212 | +2 .216 | +2 .220 | +2 .224 | +2 .228 | +2 .232 | +2 .236 | +2 .240 | +2 .244 | +2 .248 | +2 .252 |
| +3 .0 | +3 .4 | +3 .8 | +3 .12 | +3 .16 | +3 .20 | +3 .24 | +3 .28 | +3 .32 | +3 .36 | +3 .40 | +3 .44 | +3 .48 | +3 .52 | +3 .56 | +3 .60 |
| +3 .64 | +3 .68 | +3 .72 | +3 .76 | +3 .80 | +3 .84 | +3 .88 | +3 .92 | +3 .96 | +3 .100 | +3 .104 | +3 .108 | +3 .112 | +3 .116 | +3 .120 | +3 .124 |
| +3 .128 | +3 .132 | +3 .136 | +3 .140 | +3 .144 | +3 .148 | +3 .152 | +3 .156 | +3 .160 | +3 .164 | +3 .168 | +3 .172 | +3 .176 | +3 .180 | +3 .184 | +3 .188 |
| +3 .192 | +3 .196 | +3 .200 | +3 .204 | +3 .208 | +3 .212 | +3 .216 | +3 .220 | +3 .224 | +3 .228 | +3 .232 | +3 .236 | +3 .240 | +3 .244 | +3 .248 | +3 .252 |

FIG. 34

METHODS AND COMPUTER READABLE MEDIA FOR GENERATING DISPLAYS OF USER-DEFINED BLOCKS OF NETWORKING ADDRESSES

CROSS REFERENCE TO RELATED APPLICATION

This application is a continuation of U.S. patent application Ser. No. 10/642,475 filed Aug. 15, 2003 now U.S. Pat. No. 7,127,505, and entitled "METHODS, COMPUTER SYSTEMS, AND COMPUTER READABLE MEDIA FOR GENERATING DISPLAYS OF NETWORKING ADDRESSES," which is expressly incorporated herein by reference in its entirety.

TECHNICAL FIELD

The present invention is related to networking address space. More particularly, the present invention is related to the generation of displays providing information regarding the networking address space.

BACKGROUND

Networking addresses serve to identify devices and/or locations on a network and may include various classes of information, including telephone numbers, medium access control values corresponding to layer 2 of the communications protocol stack, Internet Protocol ("IP") addresses corresponding to layer 3 of the communications protocol stack, Autonomous System Numbers ("ASN") corresponding to layer 4 of the communications protocol stack, serial numbers, and others. Furthermore, each of the classes of networking addresses may have variations. For example, IP addresses may be of different varieties such as Internet Protocol version 4 ("IPv4") and Internet Protocol version 6 ("IPv6").

Networking addresses such as these must be maintained by an organization and managed appropriately. Such management must insure that no two devices, and/or locations depending upon the class of network addresses, are assigned the same networking address in a common routing area of a network. Additionally, these addresses must be managed appropriately so that networking addresses are assigned to maximize routing table efficiency. Furthermore, because networking addresses are limited commodities, if the available addresses are not appropriately managed, then addresses may be wasted by being unused while a need exists for those addresses. Thus, address uniqueness and appropriate distribution are important factors in network performance.

Conventionally, networking addresses are managed through the manual use of a text listing or a spreadsheet. The spreadsheet may consist of a column of networking addresses or blocks of addresses, with additional columns containing attributes of each address or block of addresses. The information in the cells of the text listing or spreadsheet is updated when the set of managed addresses or the attributes of the addresses have changed. Accordingly, the network administrator must study the spreadsheet to find out the attribute value(s) for a particular networking address or block of addresses. For example, a particular sheet of a spreadsheet may represent a particular network so that the networking addresses on this particular sheet are those designated for that network. Furthermore, one or more columns within a sheet may represent the status of the address block while another column represents the associated network equipment for allocated addresses. Tables 1 and 2 discussed below provide examples of spreadsheet layouts that are used to manually keep track of networking addresses.

The conventional method of manually tracking network addresses in a spreadsheet provides the administrator with no management tools other than the raw information within the spreadsheet cells. A text listing or spreadsheet may display at most a few hundred data elements in a concise format, whereas an administrator may be responsible for millions of addresses. Furthermore, views of the data are limited to the original organization of the data, for example, in order of address, which requires manual searches or additional utilities to access the information by another perspective, i.e. addresses of a particular status. For address formats such as IP that use classless interdomain routing ("CIDR") based numbering, addresses may be administered in blocks of very specific sizes and boundaries. These limits are not obvious in the conventional spreadsheet method except perhaps to those administrators with a thorough familiarity with the address format, which makes the administration of the addresses more difficult.

The lack of a visual representation creates problems for the administrator because it is difficult to see relationships between the networking addresses of a set for even moderate numbers of addresses. For example, the administrator may need to quickly see the relative number of networking addresses assigned to a first network relative to a second network. Furthermore, the administrator may need to quickly see the relative number of allocated networking addresses for a network relative to the number of free networking addresses. It is a cumbersome and time-consuming task to find such information by scanning cells of a spreadsheet, and the administration of the networking addresses is made inefficient as a result.

SUMMARY

Embodiments of the present invention address these issues and others by providing displays of networking address space. The displays may provide visual indicators of attribute values for the networking addresses so that it can be easily seen which networking addresses have a particular attribute value relative to others and/or the relative amount of address space having one attribute value or another. Accordingly, an administrator may rely upon such displays of network space when controlling how the network space is used.

One embodiment is a computer-implemented method of illustrating networking addresses. The method involves accessing definitional information of a set of the networking addresses, the definitional information defining one or more attributes for the networking addresses of the set. The method also involves rendering a display of the set of networking addresses wherein the display provides a first visual indicator for networking addresses having a first value of a first attribute and a second visual indicator for networking addresses having a second value of the first attribute.

Another embodiment is a computer system for illustrating networking addresses. The computer system includes storage containing definitional information of a set of the networking addresses, and the definitional information defines one or more attributes for the networking addresses of the set. The computer system also includes a display device and a processing device configured to initiate a display of the set of networking addresses on the display device. The display provides a first visual indicator for networking addresses having a first value of a first attribute and a second visual indicator for networking addresses having a second value of the first attribute.

Another embodiment is a computer readable medium containing instructions that when performed by a computer perform various steps. The steps include determining values of an attribute for a plurality of networking addresses. The steps further include rendering a display of the plurality of networking addresses wherein the display includes a first indicator for networking addresses having a first value for the attribute and includes a second indicator for networking addresses having a second value for the attribute.

Another embodiment is a computer-implemented method of illustrating networking address structure. The method involves accessing definitional information of a set of the networking addresses, the definitional information defining at least one root network and at least one subordinate network of the root network for the networking addresses of the set. The method further involves rendering a display of the at least one root network and at least one subordinate network of the root network, wherein the display is a tree illustrating a hierarchical structure of the root and subordinate networks.

Another embodiment is a computer-implemented method of illustrating networking addresses. The method involves constructing a multi-dimensional arrangement of a linear index of networking addresses, in which each position in the arrangement corresponds to a specific value or group of values of the index. The data set includes definitional information of the networking addresses defining one or more attributes associated with each network address. The arrangement is displayed such that at each position in the arrangement, a first visual indicator is provided for the network addresses having a first value for the first attribute and a second visual indicator is provided for the network addresses having a second value for the first attribute.

DESCRIPTION OF THE DRAWINGS

FIG. 6 shows an example of a two-dimensional grid system for rendering displays of networking addresses according to the logical operations of FIG. 5.

FIG. 19 is a screenshot including a tree structure that includes icons providing an indication of networks that are aggregate branch roots.

FIG. 26 is a table representing the text listing of networking space used to produce a map and/or tree display.

FIG. 27 is a table representing the text listing of networking space used to produce a map and/or tree display including mixed types of addresses.

FIG. 28 is a table representing the text listing of networking space used to produce a map and/or tree display including mixed types of addresses and including additional aggregation information and also representing the corresponding icons used to render the tree display.

FIG. 29 shows a first example of a two-dimensional grid system for rendering displays of networking addresses where the plot range is not defined along a byte boundary but is instead defined along a byte+2 bits.

FIG. 30 shows a second example of a two-dimensional grid system for rendering displays of networking addresses where the plot range is not defined along a byte boundary but is instead defined along a byte+2 bits.

FIG. 31 shows a first example of a two-dimensional grid system for rendering displays of networking addresses where the plot range is not defined along a byte boundary but is instead defined along a byte+4 bits.

FIG. 32 shows a second example of a two-dimensional grid system for rendering displays of networking addresses where the plot range is not defined along a byte boundary but is instead defined along a byte+4 bits.

FIG. 34 shows a second example of a two-dimensional grid system for rendering displays of networking addresses where the plot range is not defined along a byte boundary but is instead defined along a byte+6 bits.

DETAILED DESCRIPTION

Embodiments of the present invention provide visual displays of networking address space to allow administrators and others to visually see how the networking address space is being utilized. This visual information is displayed to assist the administrators and others when making determinations about the networking address space. For example, the visual information may assist the administrator in determining how effectively the networking address space is being used and when making determinations about how to modify the usage of networking address space as the need arises.

The embodiments of the present invention are implemented in a computer setting. A standalone computer may implement embodiments of the present invention. Alternatively, embodiments of the present invention may be implemented on a networked basis where resources are distributed over the network and are accessed through the network as necessary. A typical operating environment for both the standalone implementation and the network-based implementation are shown in FIG. 1.

Figure 1:
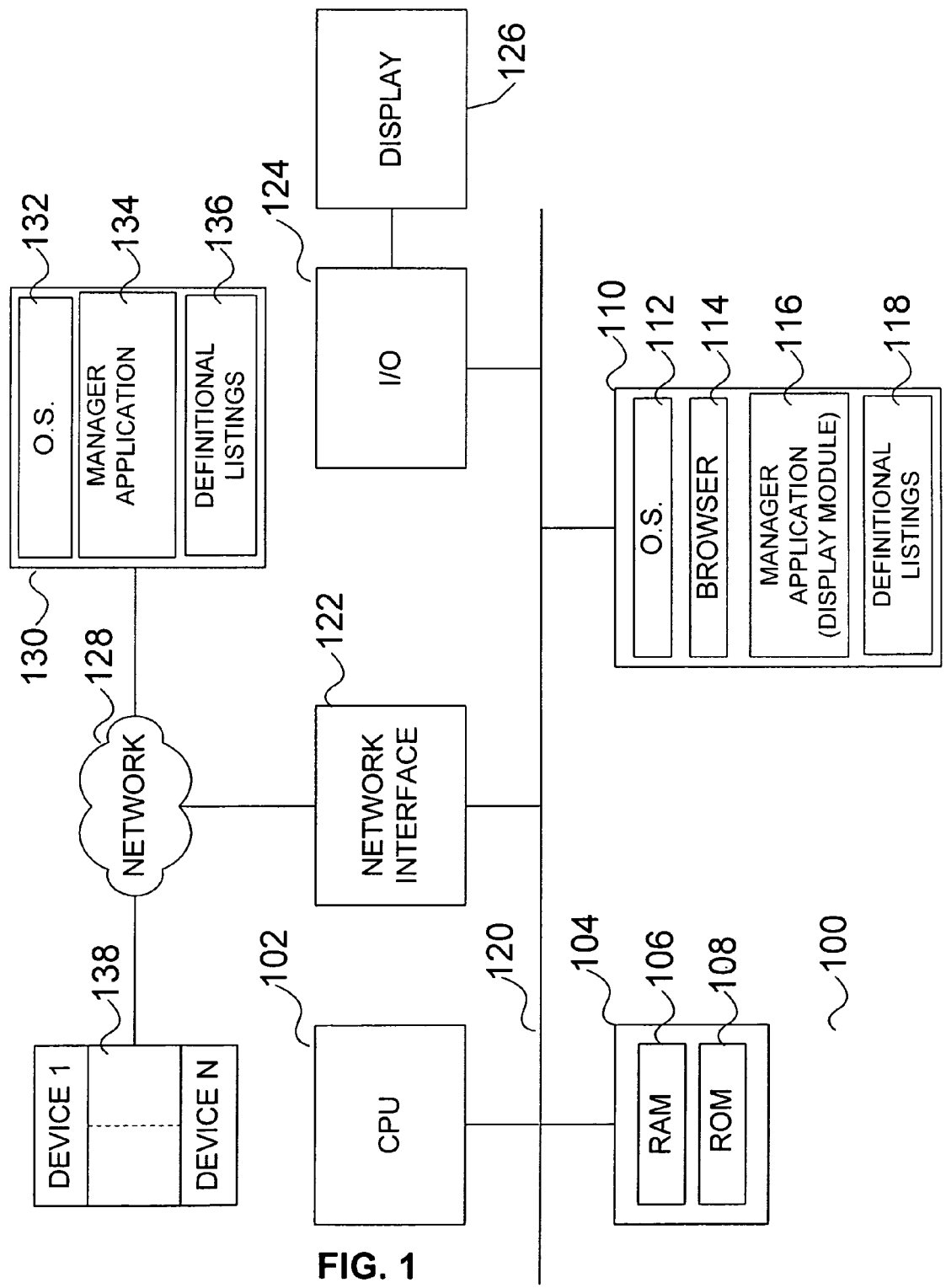
FIG. 1 shows a typical operating environment for embodiments of the present invention including a typical architecture of a computer where displays of network space may be provided.

FIG. 1 and the following discussion are intended to provide a brief, general description of a suitable computer system environment in which the invention may be implemented. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the personal computer of FIG. 1 may also be practiced in distributed computing environments where tasks are performed by remote processing devices that are linked through a communications network. In a distributed computing environment, program modules may be located in both local and remote memory storage devices.

FIG. 1 shows an illustrative computer architecture for a personal computer 100 for practicing the various embodiments of the invention. The computer architecture shown in FIG. 1 illustrates a conventional personal computer, including a central processing unit 102 ("CPU"), a system memory 104, including a random access memory 106 ("RAM") and a read-only memory ("ROM") 108, and a system bus 120 that couples the memory to the CPU 102. A basic input/output system containing the basic routines that help to transfer information between elements within the computer, such as during startup, is stored in the ROM 108. The personal computer 100 further includes a mass storage device 110 for storing an operating system 112 and application programs. The application programs may include a browser 114 such as a conventional web browser that may be used to provide the displays of networking address space and a manager application 116 that the browser 114 operates upon to render the displays. The mass storage device 110 may also store definitional listings of network space usage described below in more detail with reference to FIG. 6 that are utilized by the manager application 116.

The mass storage device 110 is connected to the CPU 102 through a mass storage controller (not shown) connected to the bus 120. The mass storage device 110 and its associated computer-readable media, provide non-volatile storage for the personal computer 100. Although the description of computer-readable media contained herein refers to a mass storage device, such as a hard disk or CD-ROM drive, it should be appreciated by those skilled in the art that computer-readable media can be any available media that can be accessed by the personal computer 100.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The personal computer 100 of FIG. 1 may also include input/output controller interfaces 124 for receiving and processing input from a number of devices, including a keyboard or mouse (not shown). Similarly, the input/output controller interfaces 124 may provide output to a display screen 126, a printer, or other type of output device. Such output may include a display of network space such as that created by the logical operations performed by the management application 116 and discussed below.

As mentioned briefly above, a number of program modules and data files may be stored in the mass storage device 110 and RAM 106 of the personal computer 100, including an operating system 112 suitable for controlling the operation of a stand-alone personal computer. The mass storage device 110 and RAM 106 may also store one or more application programs such as the browser 114 and manager application 116 that creates the visual displays of networking address space. Embodiments of the present invention provide program modules for use in conjunction with the manager program 116. The program modules may implement logical operations such as those of FIGS. 2-5 and 17 to create the various displays of the networking address space. The manager program 116 may utilize additional program modules as well such as to perform the administration of the networking address space including allocating and reclaiming networking address space.

As an alternative to providing the manager application 116 and related definitional listings 118 on the mass storage device 110 of the computer 100, these resources may be located on a communications network 128 such as the Internet as mentioned above. The computer 100 may include a network interface 122 linked to the CPU 102 through the bus 120, and the network interface 122 permits data communications to occur between programs being performed by the CPU 102, such as the browser 114, and the resources on the network 128. For example, the network interface 122 may utilize Ethernet protocol to communicate with a communications gateway of the network 128.

The resources necessary to provide visual displays of the networking address space on the computer 100 may be located on a computer server 130 also in communication with the network 128. Accordingly, the computer 100 may access the resources of the server 130 over the network such as to access application programs and data maintained by the server 130. The server 130 runs an operating system 132 which allows the server 130 to communicate with the network 128 to provide access to a manager application 134 stored by the server 130. This manager application 134 can be run by the browser 114 of the computer 100. Furthermore, the server 130 may store the definitional listings 136 for the networking address space that may be accessed as necessary by the manager application 134.

While the embodiments above refer to the manager application 116 and/or manager application 134 as being operated upon by a browser 114, it will be appreciated that these application programs may instead be implemented as independently operable computer programs that do not rely upon functionality of a browser. The particular implementation is a design choice. However, utilizing the functionality of a browser allows the manager application program to be operable across a variety of computer platforms without requiring a different manager application program for each platform.

The computer 100 or computer 130 may be an administrative computer that issues the networking address to devices of the network through operation of the manager application. Once issued, routers reference routing tables mapping connections to networking addresses to deliver packets to the device with a particular networking address and receive packets sent by the device to direct them to their destination. Such devices may be present on a global network 128 but are confined to subordinate networks such as local area networks ("LAN") where a portion of the networking address identifies the subordinate network and a remaining portion identifies the device on the subordinate network. These devices 1-N of one or more subordinate networks are shown generally in FIG. 1 as device set 138.

Figure 2:
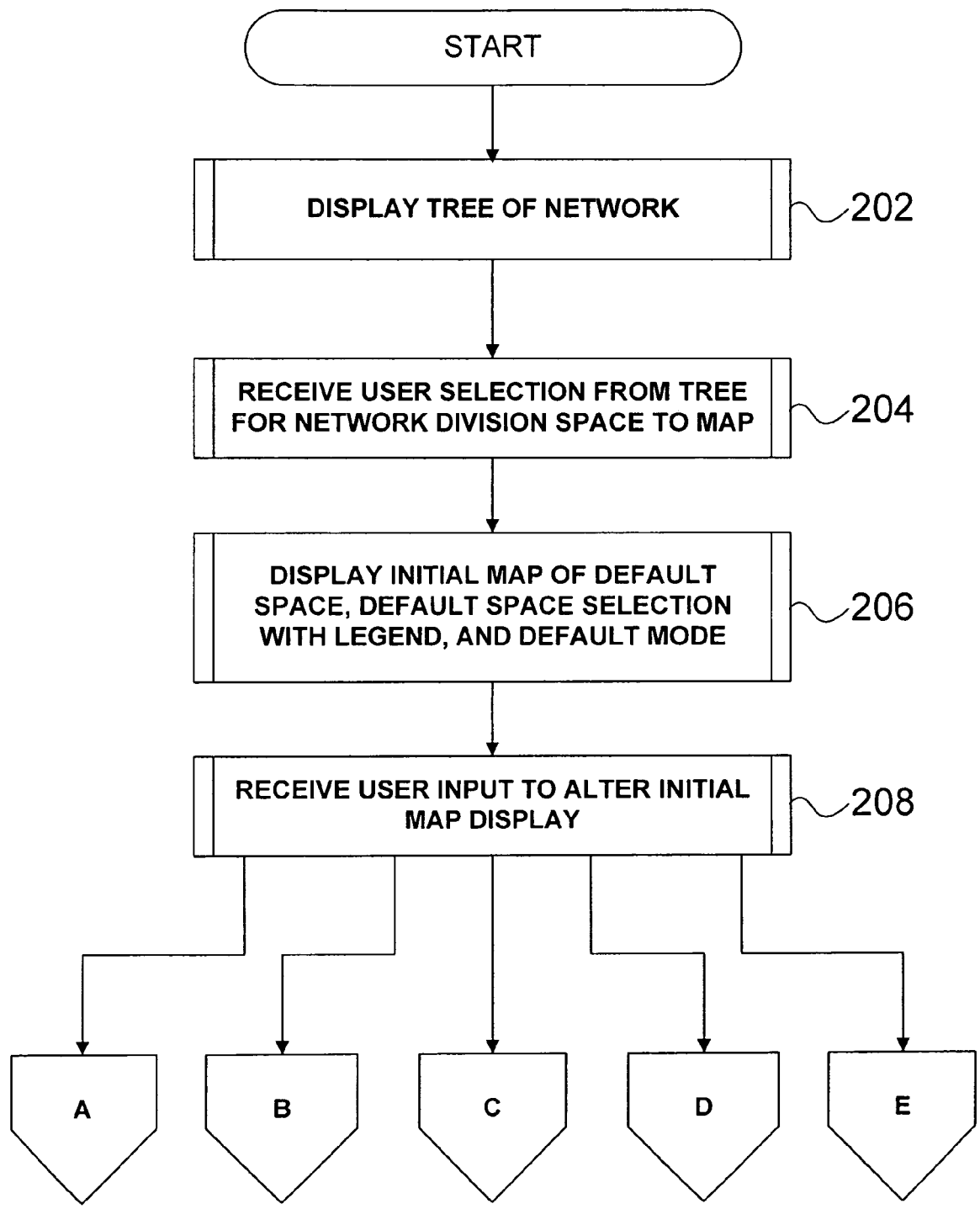
FIGS. 2-5 show a set of logical operations performed when rendering displays of networking addresses.
Figure 3:
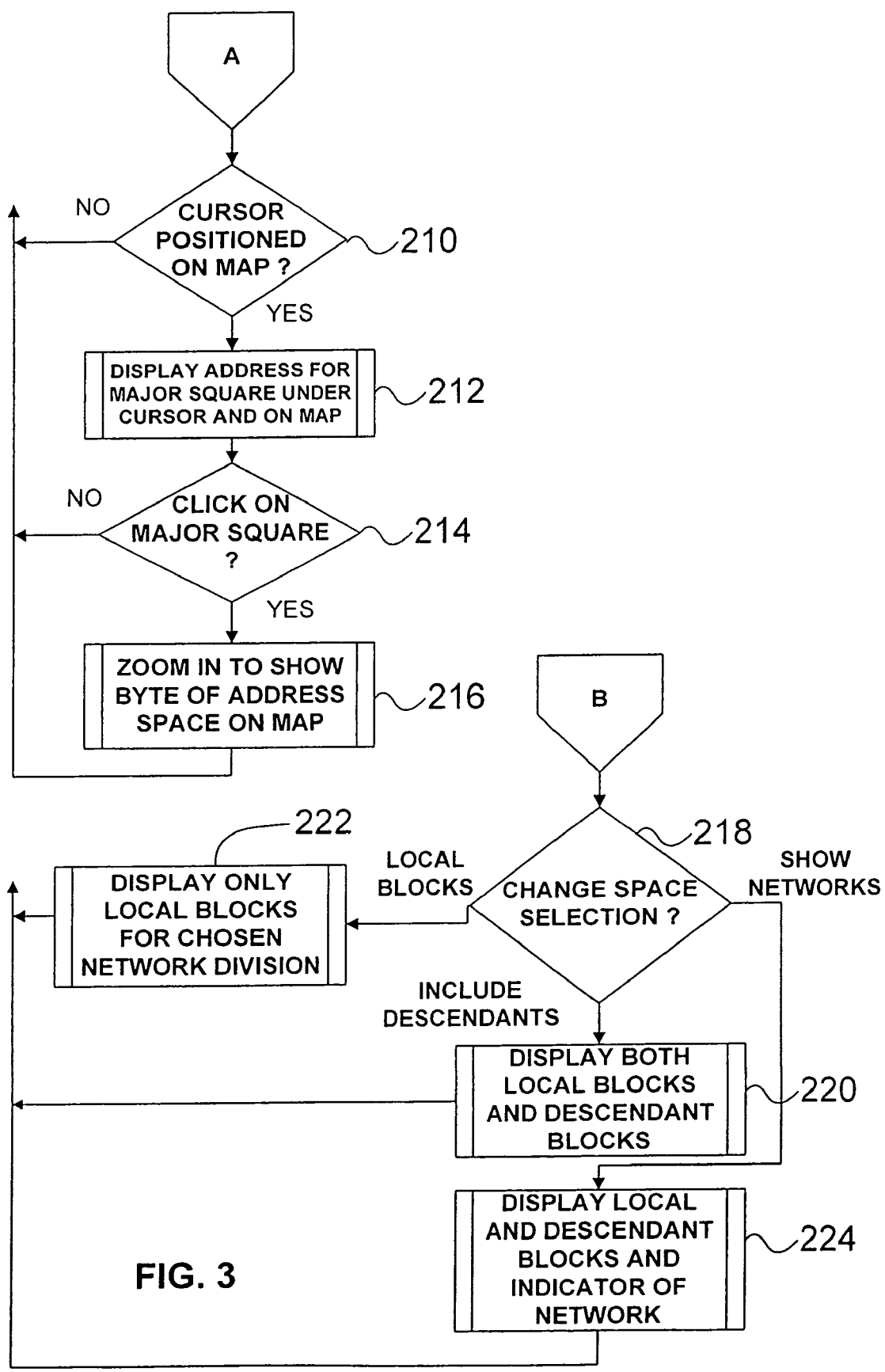
Figure 4:
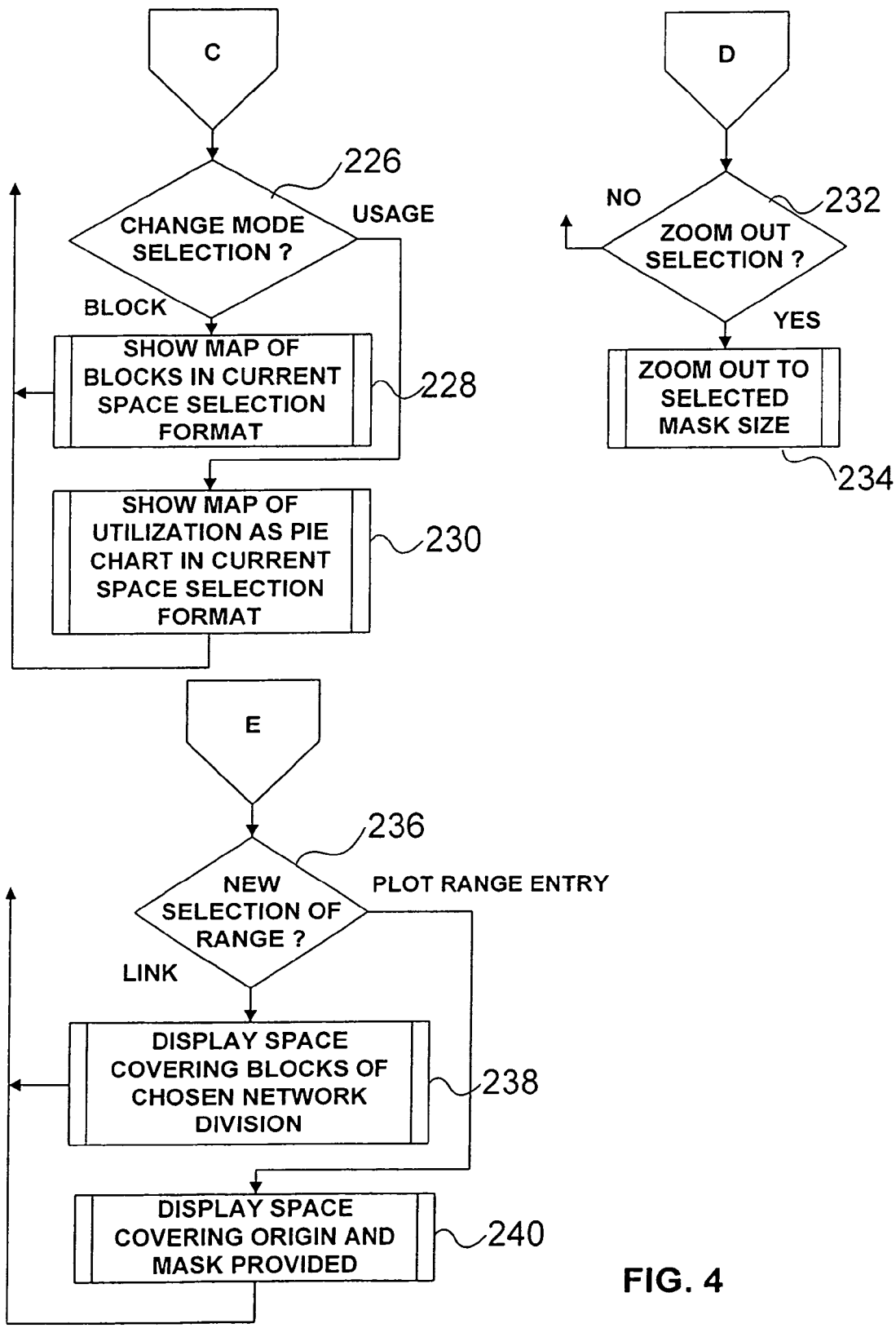
Figure 5:
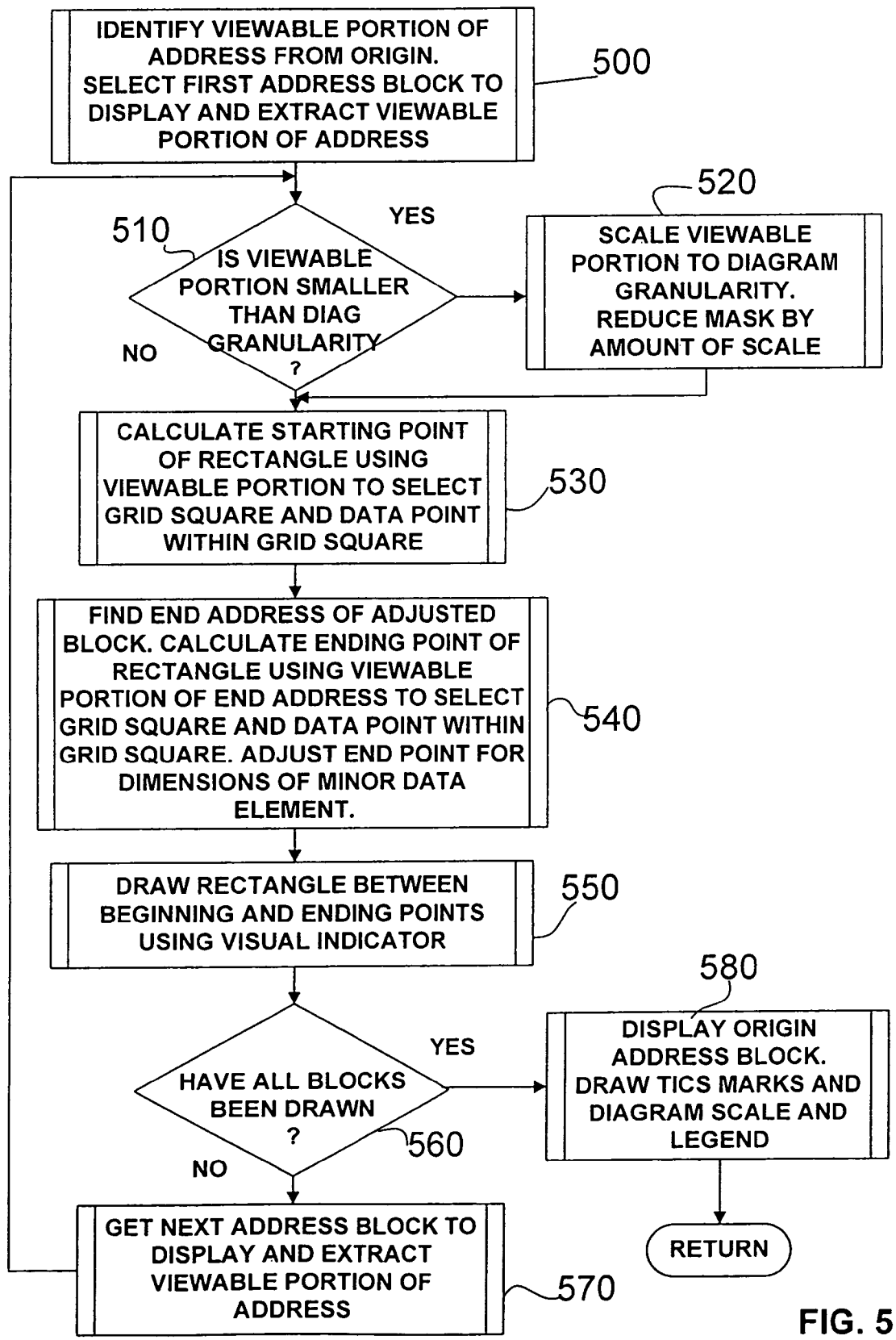

FIGS. 2-4 show the logical operations performed by the manager application when receiving input from a user to specify a map display of networking address space, and FIG. 5 shows the logical operations for creating the display that has been specified by the user input in a block mode discussed below. The block mode map display is a structured graphical display of relational information, and the structure of the block mode map display is discussed below with reference to FIG. 6. As discussed below, the map display may also be in a utilization mode to indicate percentage of use of address space rather than to illustrate the space itself. These logical operations for creating the map display that are shown in FIGS. 2-5 are discussed with reference to corresponding screenshots provided in FIGS. 7-16, 18, and 19.

Figure 7:
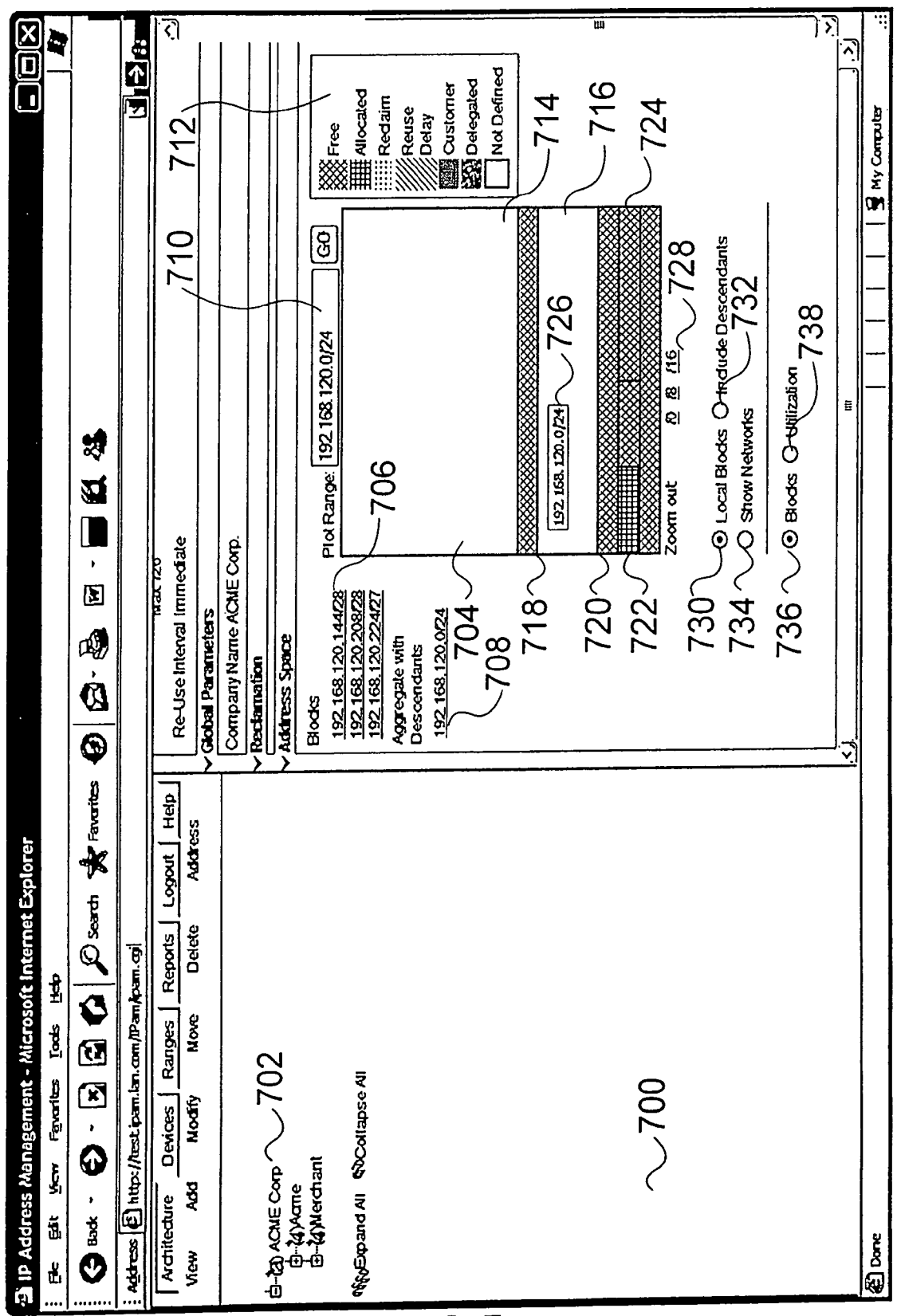
FIG. 7 is a screenshot of a displayed range of networking addresses and related status in block format for local blocks of a chosen network division where each position in the display is an individual network address block that is individually selectable.

As shown in FIG. 2, initially a tree of the network space being managed is provided at display operation 202 and as shown as tree 702 in FIG. 7. The tree 702 is a visual representation of the hierarchical structure of networks and subordinate networks. The rendering and features of the tree 702 are discussed in greater detail below with reference to FIGS. 15-17. Definitional information such as that shown in Tables 1, 2, and 3 discussed below, defines the tree structure and is accessed when rendering the tree display. Specifically, Tables 1 and 2 apply to more basic trees that do not provide information about aggregation while Table 3 applies to more advanced trees that include such information as indicators of aggregation and aggregate branch roots.

Upon displaying the tree 702, a user selection from the tree 702 is received such as by the user clicking on one of the networks of the tree 702 at input operation 204. As shown in FIG. 7, the tree 702 includes two root networks named Acme and Merchant. In the example of FIG. 7, the user has selected the Acme root network and logical operation proceeds to display operation 206 where a map of networking address space 704 is rendered. Initially, the map may show a zoomed out view of space including the space defined for the chosen network or may display a default initial space that may not include the space defined for the chosen network. Details of rendering the display of the map are described in more detail below with reference to FIG. 5.

While it is described as displaying the map initially based on a selection from the displayed tree, it will be appreciated that the map may be displayed without regard to a selection from the tree. Furthermore, while the tree structure and map display may work in conjunction, it should be appreciated that the tree and map may be independent of one another, and that the map may be displayed without displaying a tree or the tree may be displayed without displaying a map.

In the examples shown in the screenshots, the initial display provides a set of links 706 to the blocks of networking addresses that are defined for the chosen network and provides a field 710 where the user may type in the plot range (i.e., the start address and mask size) to be plotted in the map 704. Selection of the links 706 results in the map 704 displaying the networking address space that includes the addresses of the links 706 and that corresponds to the chosen network. As shown in FIG. 7, the map 704 is displaying space containing 256 addresses that includes the local blocks defined for the chosen Acme network.

The initial display also provides a legend 712 that provides the definitions of the visual indicators, such as color or patterns, that are used to differentiate address space blocks having one attribute value from those having another. For example, "Free" networking address blocks are shown in one color while "Allocated" networking address blocks are shown in a different color. Thus, someone viewing the map 704 can immediately see the relative amount of space having one attribute value versus other amounts of space having other attribute values. While the examples of the screenshots provided herein show only a single attribute being displayed, it will be appreciated that multiple attributes for address space within the map may also be displayed. For example, a block of addresses may have a particular color indicating a first attribute and may also contain a pattern indicating a second attribute.

The initial display of the map also provides zoom capabilities. For example, zoom-out selections 728, identified by the mask sizes in bits of classless inter-domain routing ("CIDR") addressing for each level of zoom. The smaller the mask size in bits, the more zoomed out the map 704 becomes such that a "/0" selection displays the entire networking address space. Zooming out based on a zoom out selection 728 is discussed in more detail below with reference to FIG. 13. Zoom-in is provided by clicking on a relevant network grid space of a block on the map 704. Zooming in based on a selection of a network grid space of the map is discussed in more detail below with reference to FIG. 14. While this example shows fixed zoom increments, the zoom could be based upon many other values of $2^n$.

The map 704 shows address space including the networking addresses defined for the Acme root network. The resolution of the map 704 is 16 individually selectable spaces by 16 individually selectable spaces. Thus, each individually selectable space represents an individual networking address. A user may place the mouse pointer on the map and allow it to hover over one of the 256 individually selectable spaces. In the example of FIG. 7, the user has positioned the mouse over the first grid space of the block 718 and a tip box 726 is displayed over the map 704 to identify the space the mouse is positioned over. In this example, the mouse is positioned over an individual IPv4 networking address of Acme.

Some of the space in map 704 is shown as not defined for Acme. Currently, the map is configured to display only local blocks, those defined for the chosen network, but not blocks defined in any of the subordinates of the chosen network. A set of user selections are provided to allow the user to re-configure the map to be displayed. These selections include map space selections for "local blocks" 730, "including descendants" 732, and "show networks" 734. The current configuration is for the local blocks selection 730. The including descendants selection 732 causes the blocks of any subordinates that also fall within the plotted address space to be shown in the plot with the attribute value as defined for the subordinate network, and this selection is discussed in more detail with reference to FIG. 9. The show networks selection 734 shows both the local blocks and the blocks of the subordinates within the plotted address space but the attribute shown changes from current status to current ownership. The show networks selection 734 is discussed in more detail with reference to FIG. 8.

In addition to providing the space selections for local blocks, include descendants, and show networks as discussed above, the display may also provide mode selections for the mapping. A block mode selection 736 and a utilization mode selection 738 are provided in this example, and the map 704 is configured according to the block mode selection 736. Thus, the map 704 is in block format, showing the grid spaces of networking address blocks as being selectable and being adjacently displayed within a 16×16 grid of network addresses. As opposed to mapping the address space with individually selectable grid spaces within the mapping, utilization mode selection 738 allows the utilization of the address space to be displayed in a format such as a pie chart that allows a quick comparison of utilization amounts. Utilization mode is discussed in more detail below with reference to FIGS. 10-12.

Network addresses comprise a linear set of values, and the block mode map display of network addresses is in a two-dimensional arrangement such as that shown in FIG. 6, which derives from the customary representation of CIDR addresses as a series of byte values. The set of 256 possible values for a byte are arranged in a 16×16 grid 602 using the most significant bits as one axis 604 and the least significant bits to form the second axis 606.

Figure 8:
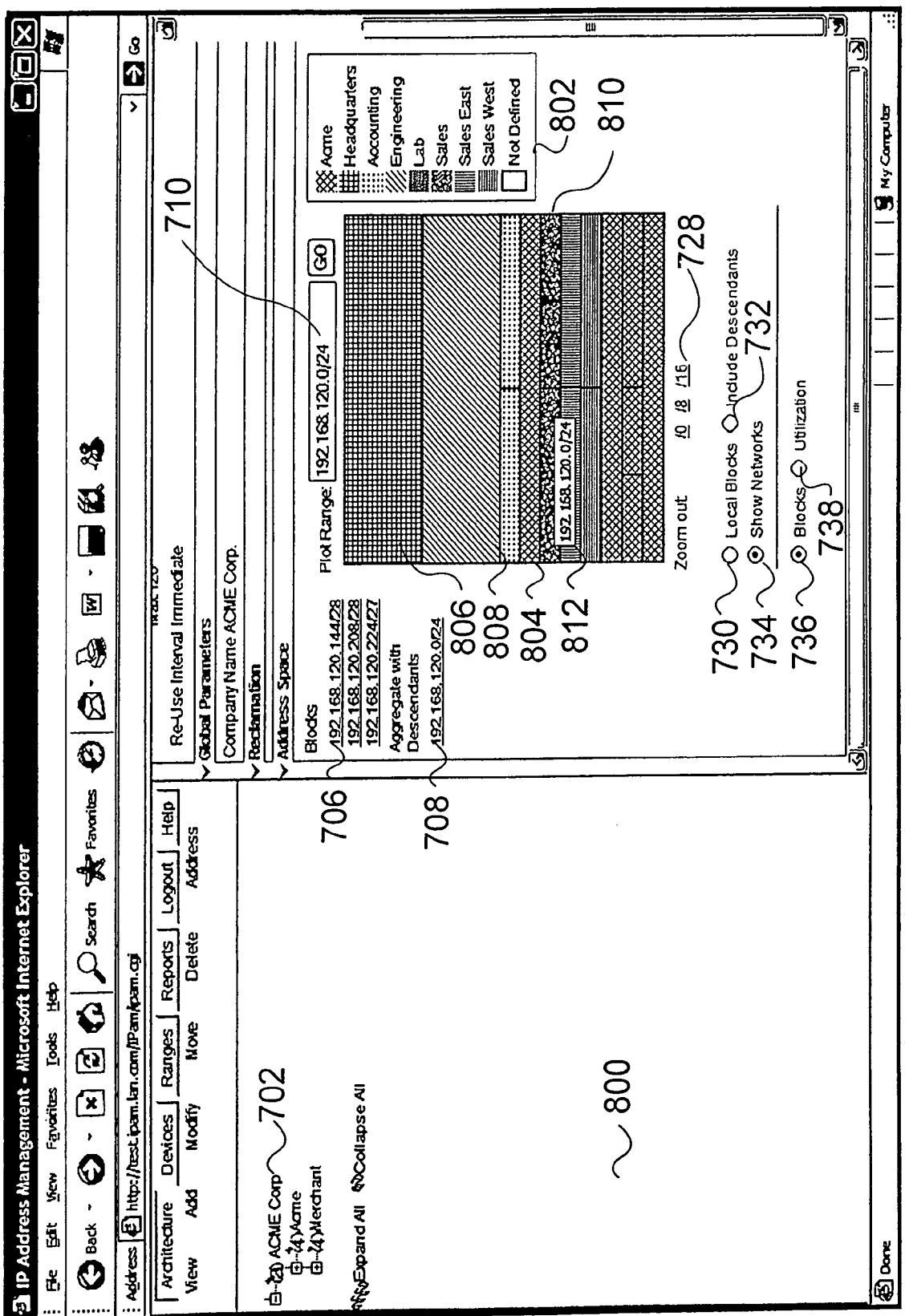
FIG. 8 is a screenshot of the displayed range of networking addresses in block format for the various networks corresponding to the chosen network division.

The 16×16 grid 602 is sufficient to display the attributes of a set of 256 individual addresses using visual indicators to differentiate address space blocks having one attribute value from those having another value of the attribute. For example, "free" addresses are shown in one color while "allocated" addresses are shown in another color. FIG. 8, discussed in greater detail below, shows an example of the display 804 with areas representing network addresses. An additional visual indicator identifies sets of network addresses that function or are represented as a block. For example, outlined rectangle 810 represents a single block composed of 8 addresses. The outline serves as an additional indicator to represent sets of related network addresses that are administered as a unit referred to as a block. This additional indicator may also represent attributes other than the primary visual indicator. For example, an allocated block of 8 addresses is shown as a single outlined rectangle, while two adjacent allocated blocks of four addresses are shown as two outlined rectangles.

Figure 14:
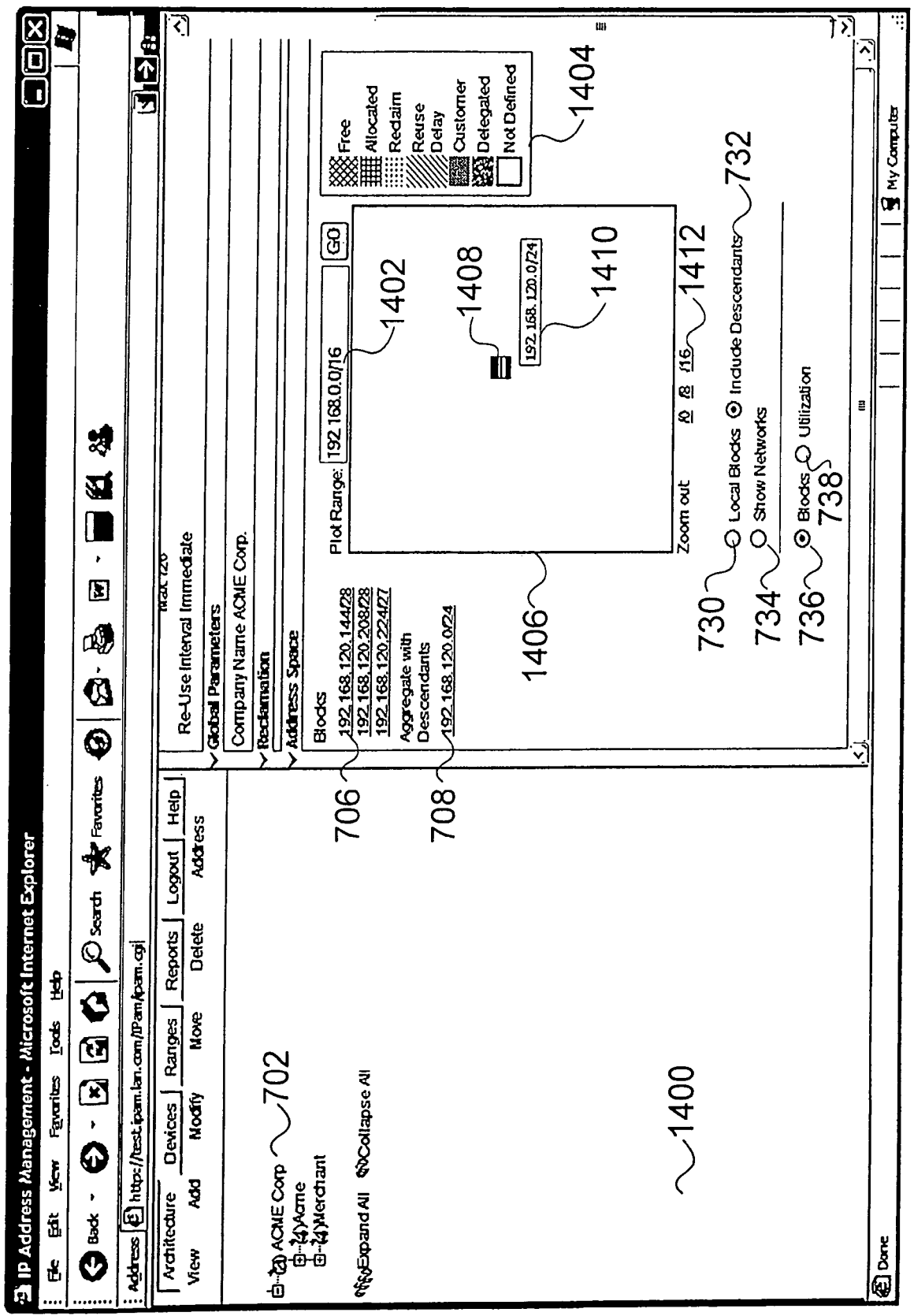
FIG. 14 is a screenshot of a zoomed out display range of networking addresses and related status in block format including the local blocks and descendents defined for the chosen network division prior to a selection of the networking addresses defined for the chosen network division being selected to zoom in to space having a mask size of 24 bits.

Display 1406 in FIG. 14, discussed in greater detail below, shows a variation of the diagram with another dimension of address values. The 16×16 grid of the display is indexed by one byte of the network address. Network address formats may have more values than may be represented on the display at one time. Each position in the 16×16 major grid space may include a smaller 16×16 minor grid space of the same layout indexed by the next byte of the network address, increasing the amount of addresses that may be represented at one time. The plot range 1402 consisting of an address and mask determines the values of the positions in the display, and determines the set of values and the level of detail that will be shown.

Plot range 1402 specifies that the display 1406 is limited to address block 192.168.0.0/16. The network portion of the address, 192.168 as determined by the mask will be the same for all values represented in the display. The third byte of the address is the index for the primary 16×16 grid. The next, or fourth, byte is the index for the secondary 16×16 grid within each primary grid position. Block 1408 represents the smaller block 192.168.120.0/24 which includes a smaller grid representing individual network addresses which have different values for the fourth byte. Address blocks smaller than those that can be illustrated completely in the display use a visual indicator representing an undersized block present in the grid square. One example of a visual indicator is a crosshair symbol centered on the minor grid square containing the undersized block. Multiple minor points containing undersized blocks within a single major grid square may be represented by an additional visual indicator, for example a double crosshair centered on the major grid square. An alternate visual indicator of undersized blocks is to draw the data in the minor grid square as a composite of the indicators of network addresses in the block. The cross-hair examples are provided below with reference to FIG. 24.

Returning to the operational flow of FIG. 2, when a user provides input through the mouse and/or typing a plot range at input operation 208, several query operations detect what the input happens to be and performs subsequent operations accordingly. Thus, the operational flow branches upon receiving the user input at input operation 208.

Where the user input positions the mouse pointer over the map in block mode, then query operation 210 of FIG. 3 detects that the mouse is positioned over a major grid square and operational flow proceeds to display operation 212. At display operation 212, the origin of the address block that the mouse is positioned over, or the address itself where the granularity of the map is down to the individual address, is displayed in the tip box such as tip box 726 of FIG. 7. The proper address block to include in the tip box is determined relative to the display coordinates of the mouse cursor on the display and relative to the display coordinates of the map on the display. Thus, if the mouse is at x1, y1, then the network block for the major grid space corresponding to the map portion displayed at x1, y1 is displayed in the tip box.

Figure 13:
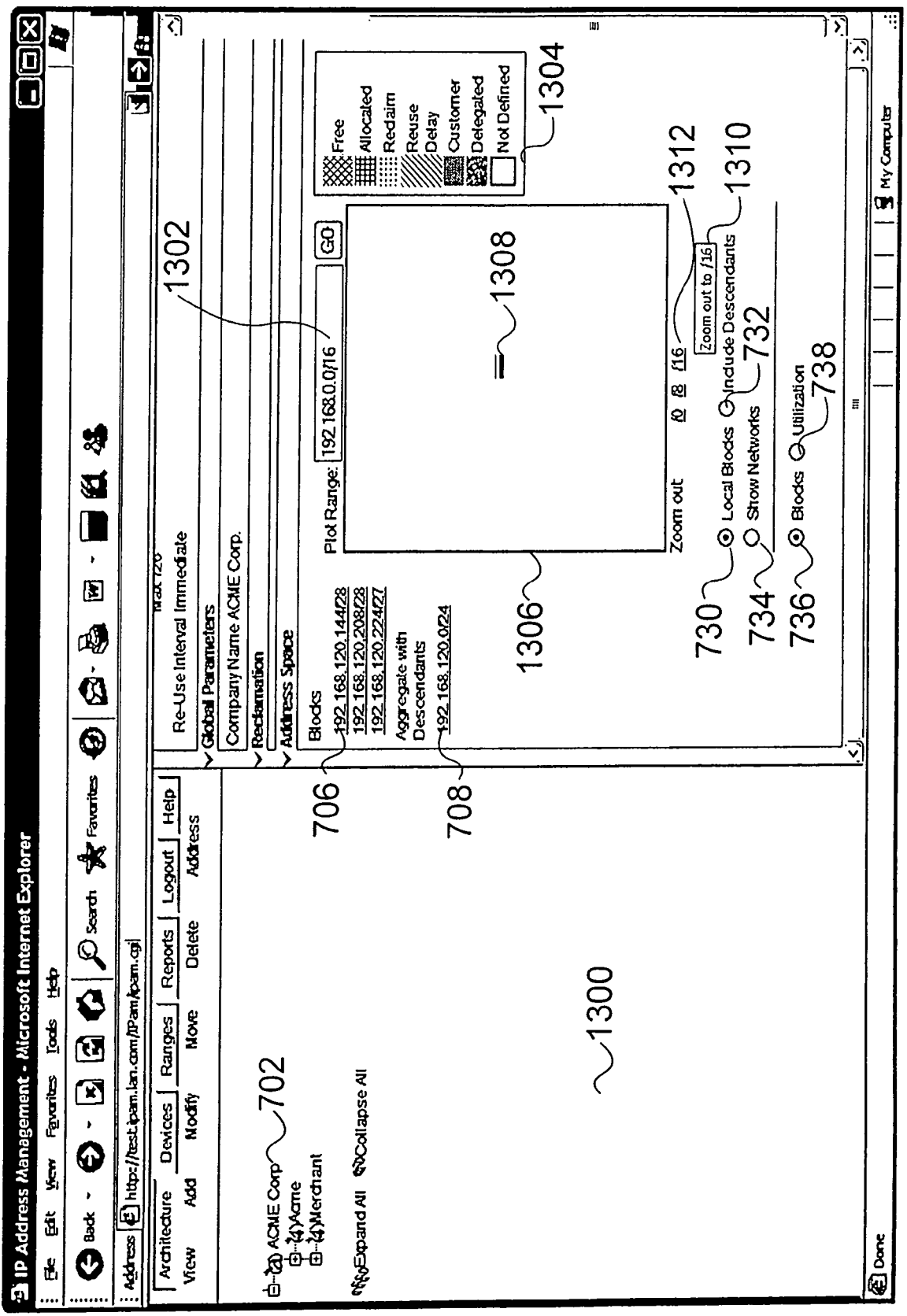
FIG. 13 is a screenshot of the displayed range of networking addresses and related status in block format including only the local blocks defined for the chosen network division after a zoom out to space having a mask size of 16 bits.

If the user mouse clicks on a portion of the display, query operation 214 determines if there is more detailed data to display. Zooming in to a grid square that does not contain visual indicators of blocks would generate a map with no data being displayed, so zooming in by clicking on the map can be restricted to only grid squares that contain additional data. If there is additional information to display for a grid square, then a zoom-in is performed to show the next byte of address space notation on the map at zoom operation 216. Rendering a block mode map, such as upon the zoom-in selection is described in greater detail below with reference to FIG. 5. Thus, if a 16×16 major grid map, representing 256 address× 256 address space, is being displayed and one of the 256 network grid spaces is selected, then the map is re-drawn to display a new data set limited to the selected grid space. If the new data set includes address values that vary by only one byte, then the block mode map is drawn as a 16×16 grid space map, representing 16 address×16 address space. For example, the map 1306 of the screenshot 1300 in FIG. 13 shows a "local block" map in block mode for Acme that is zoomed-out to a "/16" space with an origin of "192.168.0.0" as noted in the plot range field 1302. The blocks 1308 defined for Acme fit within a "/24" space and are shown as a selectable grid space of the 16×16 map 1306. As shown in the screenshot 1400 of FIG. 14, an "include descendants" map 1406 in block mode shows the "/24" space 1408 with a start address of "192.168.0.0" in the plot range field 1402. This display also provides the tip box 1410 showing the start address of the network block 1408 that the mouse is positioned over.

Where the user input received at input operation 208 is a change in the space selection, such as selecting local blocks, include descendants, or show networks, then query operation 218 directs operational flow according to the received space selection. Where the space selection is of the local blocks selection 730, then the map is displayed, either in block mode or utilization mode as dictated by mode selections 736, 738, at display operation 222. Only the local blocks, which are those defined for the chosen network, are displayed within the map and included in the block and aggregate block lists. Rendering the block mode map display is discussed in more detail below with reference to FIG. 5. The map 704 of FIG. 7 shows an example, where blocks defined for Acme are spread about within the 16×16 grid of the map in block mode. Local block space selection in utilization mode is discussed below with reference to FIG. 10. Areas 714 and 716 of FIG. 7 are shown as not defined since these areas are not designated as blocks of the root network Acme. These areas 714 and 716 may be defined for subordinate networks of Acme or may be defined for other root networks or subordinates of other root networks. However, areas 718, 720 are defined for Acme and contain blocks shown in a particular color indicative of the attribute value.

Area 718 is shown as one free block, while area 720 is shown as several adjacent blocks, such as blocks 722 and 724. Block 722 is shown as having an allocated status while the other blocks of area 720 are shown as free. While the other blocks of area 720 are shown as free, they are also divided into multiple blocks for various reasons, such as because CIDR arithmetic dictates the valid block sizes and boundaries and adjacent blocks cannot coalesce into a larger contiguous block because of an invalid block size and/or boundary. Also, some blocks may be designated in the definitional list as corresponding to a particular allocation unit, such as one LAN segment, and are shown as separate blocks to reflect the different allocation units.

Where query operation 218 detects the user input as a show networks selection 734, then a map, either in block mode or utilization mode, showing those blocks of the chosen network and its subordinates is rendered at display operation 224. Again, the display of a block mode map is described in detail below with reference to FIG. 5. The attribute provided for the blocks in the map is the network to which each block belongs. An example of the display for the show networks selection 734 is provided in the screenshot 800 of FIG. 8. This map 804 in block mode includes several other blocks than the map 704 of FIG. 7 since Acme does have subordinate networks that have space defined within the "/24" space being shown. A map for the show networks space selection in utilization mode is discussed below with reference to FIG. 11.

The blocks shown in FIG. 8 have a color matching the legend 802 associating colors to the corresponding network. The map 804 includes a relatively large contiguous block 806 that corresponds to a Headquarters subordinate network and a relatively large contiguous block 808 that corresponds to an Engineering subordinate network. Smaller blocks such as block 810 are also defined for the subordinate networks. While displaying the show networks space selection, the user may position the mouse over the map 804 so that a tip box 812 is displayed as discussed above to indicate the individually selectable network grid space, which as shown is an individual networking address. Thus, from map 804, an administrator can quickly see the relationship of the addresses for the root network and its subordinates.

Figure 9:
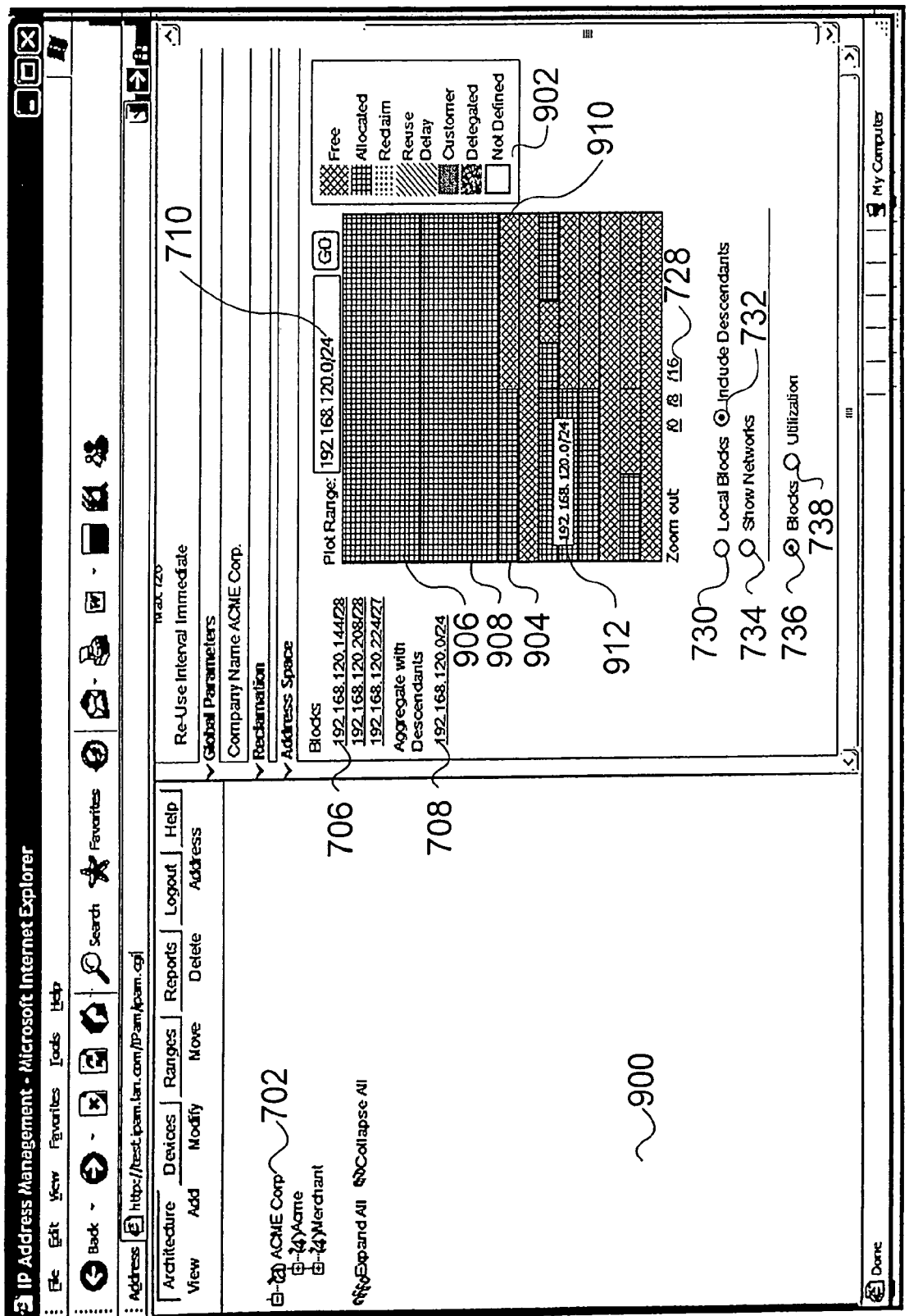
FIG. 9 is a screenshot of the displayed range of networking addresses and related status in block format including both the local blocks and descendants of the chosen network division.

When the user input received at input operation 208 is an include descendants selection 732, then a map such as map 904 of screenshot 900 of FIG. 9 is rendered at display operation 220, discussed in greater detail below with reference to FIG. 5 for block mode maps. This map 904 is in block mode and displays all of the blocks in the current space that correspond to the root and its aggregate subordinates and continues to show the status of each block, such as free or allocated, as was shown for the local blocks only in the map 704 of FIG. 7. Maps with the include descendants space selection in utilization mode are discussed below with reference to FIG. 12. As shown in the example of FIG. 9 large contiguous blocks 906 and 908 of subordinate networks are shown as allocated. Other blocks of subordinates such as block 910 are shown as free. A legend 902 like the legend 712 of FIG. 7 is provided to illustrate what status the color indicators of the blocks represent. Additionally, a tip box 912 is displayed when the mouse is positioned over an individually selectable network grid space, which again is a single networking address in the example shown.

When the user input received at input operation 208 is a mode selection, then query operation 226 directs the operational flow accordingly. Where the mode selection is for block mode, then a map is rendered at display operation 228 in block mode. The previous discussions above in relation to local blocks selection 730, include descendants 732, and show networks 734 and that referred to FIGS. 7-9 covered examples of displays where the block mode is selected. Thus, for a particular current space selection 730, 732, or 734, a block mode map is rendered for that space selection at display operation 228, and the details of rendering the block mode map is described in greater detail below with reference to FIG. 5.

Where the mode selection is for utilization mode, then a map is rendered at display operation 230 in utilization mode. Utilization mode maps may be of various forms to show the relative amount of space that has one attribute value versus another. However, pie charts are effective utilization mode maps and examples of pie chart maps are provided in FIGS. 10-12. Creating the pie charts involves a simple calculation of the contribution of a block or set of blocks to the whole, where the amount of address space of a block or set of blocks is divided by the total amount of address space being displayed to calculate the percentages to be used when displaying the pie charts.

Figure 10:
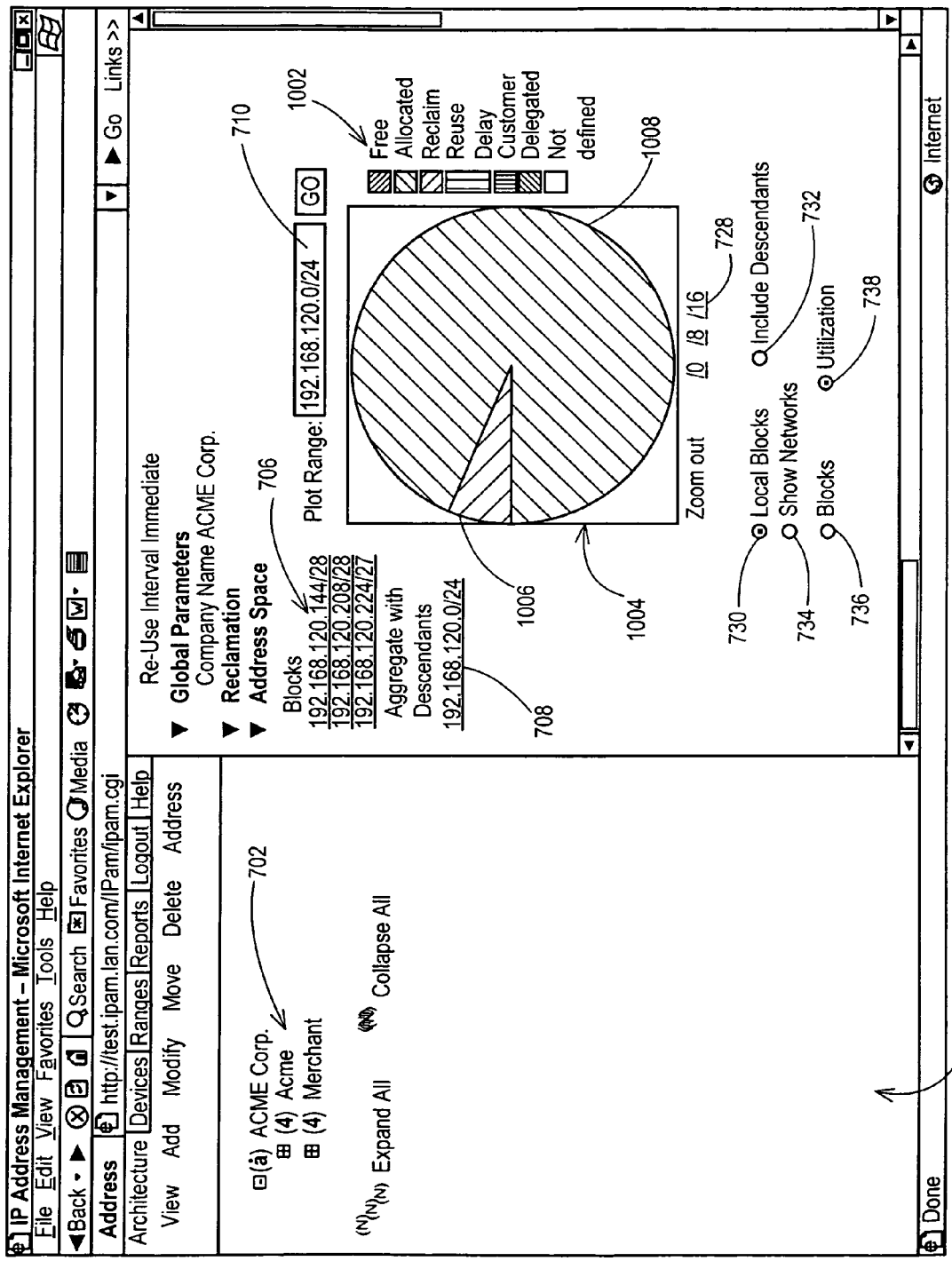
FIG. 10 is a screenshot of the displayed range of networking addresses and related status in utilization format for local blocks of the chosen network division.

In the screenshot 1000 of FIG. 10, a utilization mode map 1004 is shown for a local blocks space selection for the chosen network, Acme. Thus, the percentages of the map 1004 pertain only to those blocks of the root network and do not include contributions of the subordinate networks. A legend 1002 is provided to indicate what status the colors of the map 1004 represent. The map 1004 in this example includes a first pie wedge 1006 that represents the relatively small amount of address space of Acme that has been allocated. A second pie wedge 1008 represents the relatively large amount of address space of Acme that is free.

Figure 11:
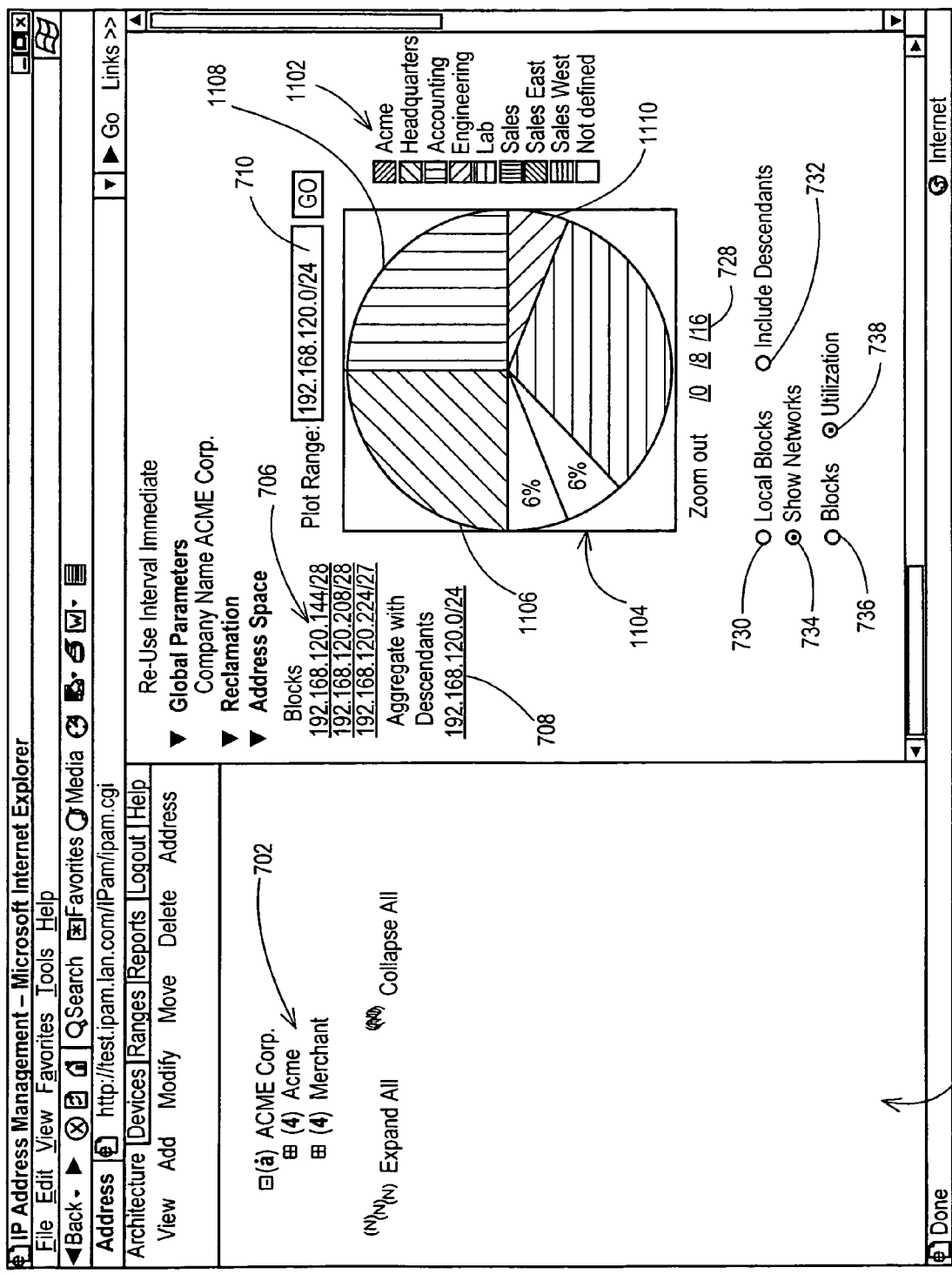
FIG. 11 is a screenshot of the displayed range of networking addresses in utilization format for the various networks defined for the chosen network division.

In the screenshot 1100 of FIG. 11, a utilization mode map 1104 is shown for a show networks space selection of the chosen network. The percentages of the map 1104 pertain to all of the blocks within the current space that are defined for the root network chosen and any blocks of subordinate networks of that root. A legend 1102 is provided to indicate what network the colors of the map 1104 represent. In this example, there are several subordinate networks of Acme, so there are several different pie wedges within the map 1104. Wedge 1106 represents the amount of address space defined for Acme while the other wedges represent the amounts of address space of the subordinates. For example, wedge 1108 represents the amount of address space defined for a Headquarters subordinate while wedge 1110 represents an Accounting subordinate.

Figure 12:
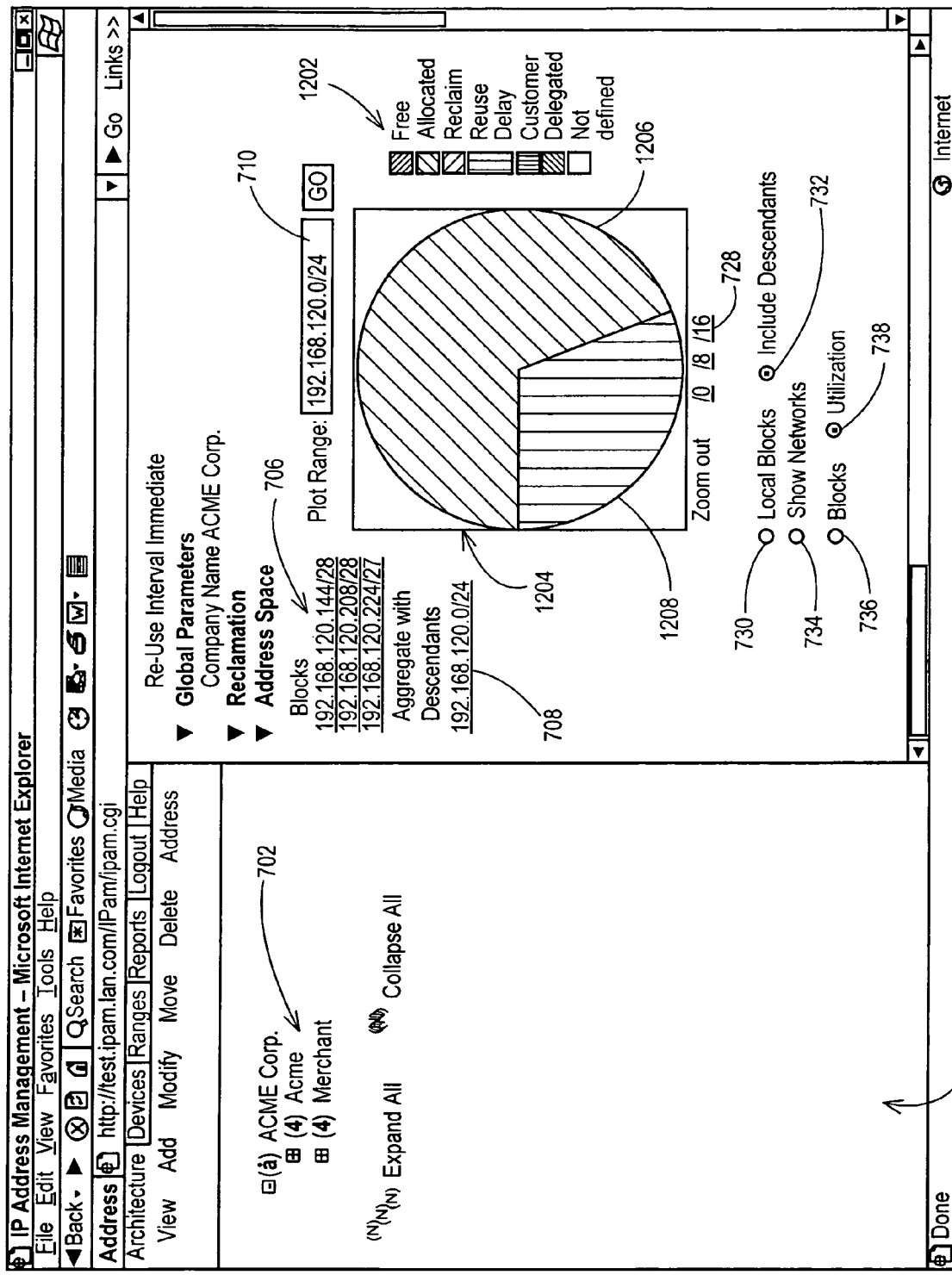
FIG. 12 is a screenshot of the displayed range of networking addresses and related status in utilization format including both the local blocks and descendants defined for the chosen network division.

In the screenshot 1200 of FIG. 12, a utilization mode map 1204 is shown for an include descendants space selection of the chosen network. The percentages of the map 1204 pertain to all of the blocks within the current space that are defined for the root network chosen and any blocks of subordinate networks from that root. A legend 1202 is provided to indicate what status the colors of the map 1204 represent. In this example, there are several aggregate subordinate networks of Acme, but the utilization is grouped according to status rather than network so that multiple subordinates and the root may contribute to a single pie wedge. In this example there are two pie wedges because all of the blocks of the root and its subordinate have either a free status or an allocated status. The smaller pie wedge 1208 represents the amount of address space that is free while the larger pie wedge 1206 represents the amount that has been allocated.

Where the input received at input operation 208 is a zoom-out selection, such as selection 728 of FIG. 7, then the resulting map displayed in block mode covers a plot range increased in size as far as is instructed by the selection. A zoom-out selection is detected at query operation 232 of FIG. 4. Once a zoom-out selection is detected, then the block mode map is displayed as zoomed out to the selected mask size at display operation 234, wherein the details of rendering a block mode map such as after a zoom out selection is discussed in greater detail below with reference to FIG. 5. For example, if the "/0" zoom-out option is selected, then the entire network space is displayed, based on the first two significant bytes, within the resulting map, such as "0.0.0.0/0" as the plot range for IPv4 space. As shown in FIGS. 13 and 14, where the "/16" is selected for an IPv4 address space, then the resulting map has a plot range for IPv4 space is "###.###.0.0/16" as shown in fields 1302 and 1402, and the map shows the last two bytes of this address range on the major and minor grid axes.

Upon zooming out, the various selections remain available to the user. The space selections 730, 732, and 734 remain operable to switch between the options for the displayed space. As an example, the zoomed-out view in FIG. 13 shows local blocks only while the zoomed-out view in FIG. 14 shows local blocks and also includes descendants. Furthermore, as shown in FIG. 14, the tip box is displayed when the mouse pointer is positioned over a major grid space of the map. Also, when the mouse cursor is positioned over a zoom-out selection, such as selection 1312 of FIG. 13 or 1412 of FIG. 14, then a tip box 1310 may be displayed to provide an indication that clicking on the selection will result in a zoomed-out map display. Additionally, the legends 1304 and 1404 remain for the zoomed-out displays since the major grid spaces 1308 and 1408 continue to reflect the attribute values based on color within the minor grid spaces.

When the input received at input operation 208 is a new selection of a range to plot other than a zoom-in or zoom-out as previously discussed, then query operation 236 directs the operational flow accordingly. For example, the input may be the user clicking on one of the links from the set 706 or link 708 of FIG. 7 to cause the map to be zoomed to the appropriate range and location of address space that covers the chosen network. Display operation 238 then renders the map display for that address space, where the details of rendering a block mode map such as after a link selection are described in greater detail below with reference to FIG. 5. As another example, the input may be the user entering the start address and mask size in the plot range field 710. In that case, display operation 240 then renders the map display for the address space defined by the start address and mask, again wherein the details of rendering a block mode map display such as after a plot range entry are described in greater detail immediately below with reference to FIG. 5.

Figure 20:
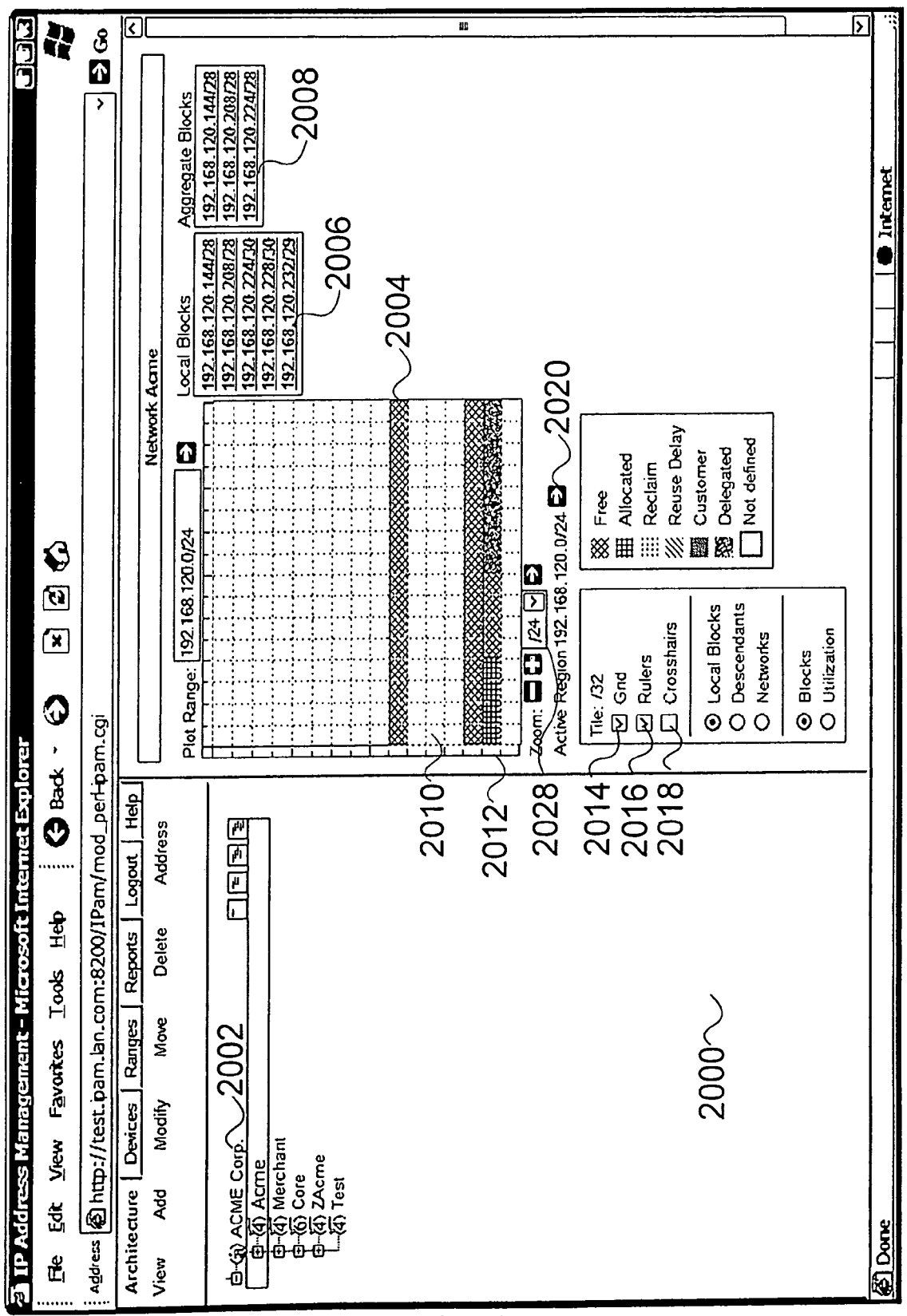
FIG. 20 is a screenshot of a displayed range of network addresses in block format with enhanced menu selections for adding grid lines, rulers, crosshairs, and plot range.

The plot range used to determine the scope of the display is a valid CIDR block, with a mask restricted to the configured increment. Any address submitted by the input field 710, link in address block 706 or 708, or other input such as an active range described below with reference to FIG. 20 is converted to a valid CIDR block of an allowed increment and containing the submitted address. If the plot range is entered without a mask size, then the currently selected mask is used.

FIG. 5 shows the logical operations of an embodiment for rendering the block mode map display for the network address space. The block mode map is based upon the input provided by the user, such as an initial selection of a network, a plot range entry, a zoom in or out selection, or a selection of a link for a set of blocks, each of which is discussed above. When making such a selection, there is a start address and mask size defining a plot range. Thus, the input to the logical operations of FIG. 5 include the start address and mask size.

From this information, the details of the address space to be mapped may be extracted from the definitional information for the address space. Table 1, shown in FIG. 26, which may be a text listing, database, spreadsheet, or other source of address information, provides the definitional information of the network space that the user may choose to map. As mentioned, Table 1 is a basic table for producing the map and tree structure. Table 1 may be broken into two separate tables, the information on the left for generating a map and the information on the right for generating the tree. Table 3 is a more comprehensive table that includes additional information that may be used when building the map and tree and interrelating the map and tree such that clicking on the tree results in changes to the map.

As shown in Table 1, this definitional listing corresponds to the screenshots of FIGS. 7-15. The definitional listing includes the start address of a block and the associated mask size for the block. The size in total number of individual addresses may also be included in the definitional listing such as to facilitate the computation of the percent of usage for a block relative to other blocks of a given address space. Various attributes are also specified for the blocks, including the status which may be one of various values and the location (i.e., the network that the block is assigned to). The definitional listing may also include additional information such as for building a network tree discussed below with reference to FIGS. 15-17, such as relating each location to a parent location where the subordinate network corresponding to a location is aggregated with its parent, and this additional information may also specify the type of network at each location.

Again with reference to FIG. 5, the logical operations for rendering the map display according to the user input and the definitional information begins at setup operation 500 where the viewable portion of the chosen address space from the origin is identified. So, when the input is received, the mask identifies the viewable portion based on what the map is capable of displaying. In the example screenshots, the map includes 256×256 pixels, providing a 16×16 major grid and a 16×16 minor grid within each grid square of the major grid. Thus, two bytes of address space may be displayed in this illustrative map. For this example of displaying two bytes, the most two significant bytes of the chosen address space are displayed. Where the mask is a /0, then the first and second bytes of the address space will be displayed. For a /8, the middle two bytes of an IPv4 address will be displayed (i.e., the second and third byte of an IPv4 or IPv6 address). For a /16, the last two bytes of an IPv4 address will be displayed (i.e., the third and fourth byte of an IPv4 or IPv6 address). Where the mask is a /24, then the last byte will be displayed for an IPv4 address, and this last byte will be scaled to fill the map. For IPv6 address space, a /24 mask results in the fourth and fifth bytes being displayed.

Also at setup operation 500, the first address block to display is selected and the viewable portion of the address is extracted. The information in the text listing is filtered so that those blocks that include or are contained within the plot range are included in the set to be displayed, and if the "local blocks" selection has been made, then only the blocks within the plot range that are assigned in the spreadsheet to the chosen network are included in the set. For example, if the map is to display blocks using normalized plot range 192.168.120.0 /24, then those blocks of this plot range will be included in the map upon being filtered from the text listing. From Table 1, the blocks filtered from the text listing to be included in the map would be those within this plot range which include 192.168.120.144 /28, 192.168.120.208 /28, 192.168.120.224 /30, 192.168.120.228 /30, 192.168.120.232 /29, and 192.168.120.240 /28. The first address block to display is found from these addresses filtered from the text listing based on their location within the plot range, which in this example is 192.168.120.144 /28. Because the plot range has a mask of /24 in this example, the viewable portion is the fourth and last byte, which is 0.144.

The reason the first block to display has a first byte of 0.144 rather than 0.0 is due to the fact that the map in this example is displaying only the local blocks such that the entire major grid space is not being filled since some of the space is for descendant blocks. Had this example been for an "include descendants" map, then the first block would have been 192.168.120.0 /26, with the last byte scaled to produce 0.0 /18, which would map to the first row and first column (see FIG. 6).

At query operation 510, it is detected whether the viewable portion is smaller than the diagram granularity. Thus, it is determined whether the number of bytes of the viewable portion is less than the number of bytes that the map can display. In the examples provided herein, the map has a fixed display of two bytes which is believed to be an optimal amount of information for the display. However, it will be appreciated that the displayed map may be larger than 256 pixels by 256 pixels and that the resolution of the map may itself be a variable that the user can input. In this example, the mask size of the origin block is /24 which indicates only a single byte of IPv4 space is available for display while the map can display two bytes. Accordingly, query operation 510 detects that the viewable portion is smaller than the diagram granularity so operational flow transitions to shift operation 520. Had the mask of this example been a /0, /8, or /16, then the viewable portion would be at least two bytes such that operational flow transitions directly to start operation 530.

At shift operation 520, the viewable portion is scaled to the diagram granularity. So for a /24 origin block with one viewable byte and a map that displays two viewable bytes, then the viewable portion of one byte is scaled to two bytes by shifting the viewable portion by one byte to the left. The mask size of the current block is reduced by 8 bits to account for the one byte shift. So the 0.144 /28 becomes 0.144.0 /20. The least significant byte 0.0, which will be displayed on the minor grid axes, has a continuous value for the entire minor grid within a given major grid space due to the shifting of the last byte of actual address space to the left.

At start operation 530, the beginning point of the current adjusted block is determined for positioning it on the map at a minor grid data point within a major grid space. The first byte, 0.144, goes into row 9 and column 0 of the zero-based map (see FIG. 6). The last byte 0.0 maps to row zero and column zero of the minor grid for the major grid space at row nine, column zero, which is pixel (0, 144) in the zero-based 256×256 pixel image where each element of the minor grid maps to one pixel. Any adjustment for mapping pixels to the image may also be performed at this stage wherein each element does not map directly to one pixel of the image. The calculations for mapping the first and last bytes to the pixel image are discussed below.

Once the start point has been found at start operation 530, operational flow transitions to end operation 540 where the end of the current adjusted block is found. The end address of the current adjusted block is the first address of the block plus the number of addresses as indicated by the mask. Thus, for the 0.144.0 /20 adjusted block of IPv4 space, the end address is the 12 bits (i.e., 32 minus 20) of addresses, i.e. 4096 addresses, from this start point such that the end point is address 0.159.255. The first byte of this end point, 0.159, goes in row nine and column 15 (see FIG. 6). The last byte of this end point goes in row 15 and column 15 of the zero-based minor grid space within the major grid square at row 9 and column 15. This end point maps to pixel (255, 159) in the zero-based pixel image. Any adjustment for mapping pixels to the image may also be performed at this stage. However, mapping 16×16 elements in each grid space square of a 16×16 grid space into a 256×256 pixel image means that each data element of the minor grid corresponds to one pixel, so no adjustment is necessary in this case.

The pixel positions for the start point and end points of a block may be calculated as follows. The major grid row is found by dividing the first block value by the height of the major grid to find the integer portion (e.g., 144 div 16=row 9; 159 div 16=row 9). The major grid column is found by taking the first byte modulo the width of the major grid (e.g., 144 mod 16=column 0; 159 mod 16=column 15). The minor grid row is found by dividing the second byte by the minor grid height and taking the integer portion (e.g., 0 div 16=row 0; 255 div 16=row 15). The minor grid column is found by taking the second byte modulo the width of the minor grid (e.g., 0 mod 16=column 0; 255 mod 16=column 15). The X axis starting pixel is then found by multiplying the major grid column by the pixel width of each major square and then adding the minor grid column (e.g., 0*16+0=X axis pixel coordinate 0). The Y axis starting pixel is found by multiplying the major grid row by the pixel height of each major square and then adding the minor grid row (e.g., 9*16+0=Y axis pixel coordinate 144). The X axis end pixel is found by multiplying the major grid column by the pixel width of each major square and then adding in the minor grid column and any fill width, where the fill width is used to adjust where one data element is greater than one image pixel (e.g., 15*16+15+0=X axis pixel coordinate 255). The Y axis end pixel is found by multiplying the major grid row by the pixel height of each major square and then adding in the minor grid row and any fill height (e.g., 9*16+15+0=Y axis pixel coordinate 159).

Upon finding the start point and end point of the current adjusted block, operational flow transitions to draw operation 550, where the block is represented within the grid space being displayed in one or more various ways. For example, as shown in the screenshots, the block is represented by drawing in a boundary rectangle extending from the start point of (0,144) in the 256×256 pixel image space to the end point of (255,159). Furthermore, this rectangle may be filled with the appropriate color based on the criteria the user has selected for the map and based on the value for the block from the spreadsheet. For example, the user may have selected "local blocks" which results in the status of the block being found from the spreadsheet, which is "free" for the 192.168.120.144 /28 block which corresponds to the 0.144.0/20 adjusted block being rendered. In this example, "free" is represented by green so the block is filled with green color.

Upon drawing the block within the grid space, query operation 560 detects whether all blocks that have been filtered from the spreadsheet according to the user input have been drawn. If all of the blocks have not been drawn, then operational flow transitions to next block operation 570 where the next address block of those address blocks filtered from the spreadsheet is obtained and its viewable portion is extracted. Then operational flow returns to query operation 510 to repeat the loop. If all of those blocks filtered from the spreadsheet have been drawn, then operational flow transitions to display operation 580 where the origin block consisting of all of the adjusted blocks that have been drawn is sent to the display for viewing by the user. Additional features may be added here, by displaying tic marks and a diagram scale for the map, each of which is discussed in more detail with reference to FIG. 18.

Figure 18:
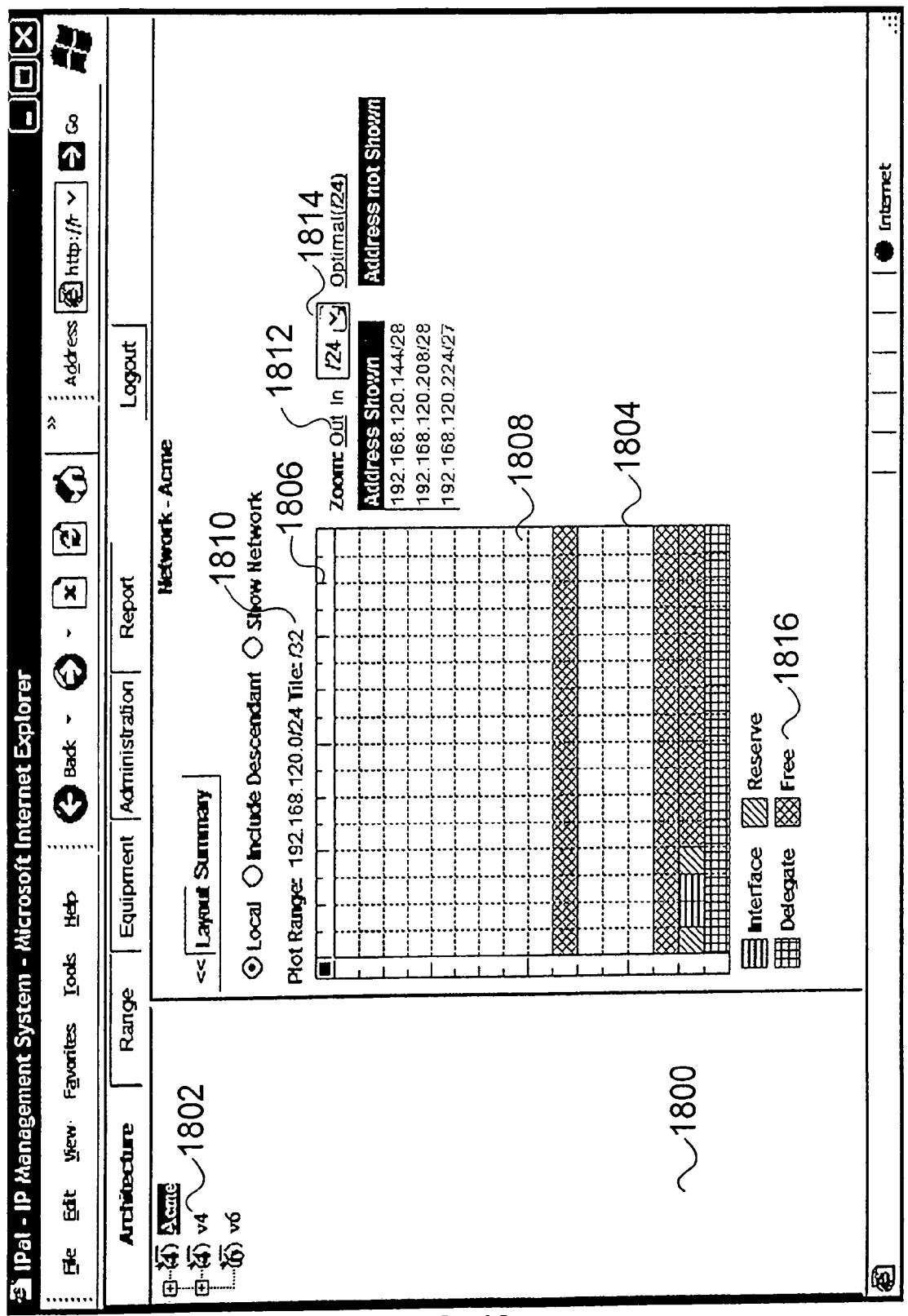
FIG. 18 is a screenshot of a displayed range of network addresses in block format in an alternative layout that includes additional features.

FIG. 18 is a screenshot 1800 illustrating an alternate layout for the map 1804. A network has been selected from the tree 1802 to display the map 1804. The map 1804 includes an outline 1808 of the major grid and also provides tic marks 1806 for both the X axis and Y axis. A legend 1816 is provided to define the visual indicators for the blocks being displayed. In this example, "local blocks" has again been selected to show those blocks assigned to the Acme network. Additionally, this map 1804 shows a /24 address space but provides zoom in/out links 1812 and a zoom in/out level drop down menu 1814 that allows the mask to be set to control the zoom in/out. When zooming in, the appropriate portion of the map to zoom into may be either a default region, or the region last selected by the user whose plot range is buffered until replaced with a newly selected region. A diagram scale 1810 is also provided for the map 1804 to indicate to the user the amount of address space within each major grid square. In this example, the diagram scale is a /32 indicating that each major grid square corresponds to a single network address rather than a set of addresses.

As discussed above in relation to FIG. 7, a tree 702 showing the hierarchical structure of the networks of an organization may be displayed such that the user may click on a network of the tree to then begin rendering maps relevant to that network. The tree 702 is shown in FIG. 7 in a partially collapsed form. The organization ACME Corp. has been expanded to show two root networks, Acme and Merchant where, such as in FIG. 15, the name 1502 of the network is displayed at a level of the tree. The tree 702 can be further expanded as shown in the screenshot 1500 of FIG. 15. Here, the tree 702' has been expanded further to show all of the subordinate networks 1504 of the Acme root and all of the subordinate networks 1506 of those that are subordinate to Acme.

Within the tree display 702', several controls may be provided. For example, an expansion/contraction control 1516 may be provided for each network level that has subordinates to control whether the subordinates are displayed. Additionally, an expand all control 1512 and collapse all control 1514 may be provided to enable the user to completely expand or collapse all networks including roots and subordinates for the ACME Corp. organization. Additional controls for the tree, such as a restore control and a collapse to focus control discussed in more detail below, may also be included to provide other functionality.

Figure 15:
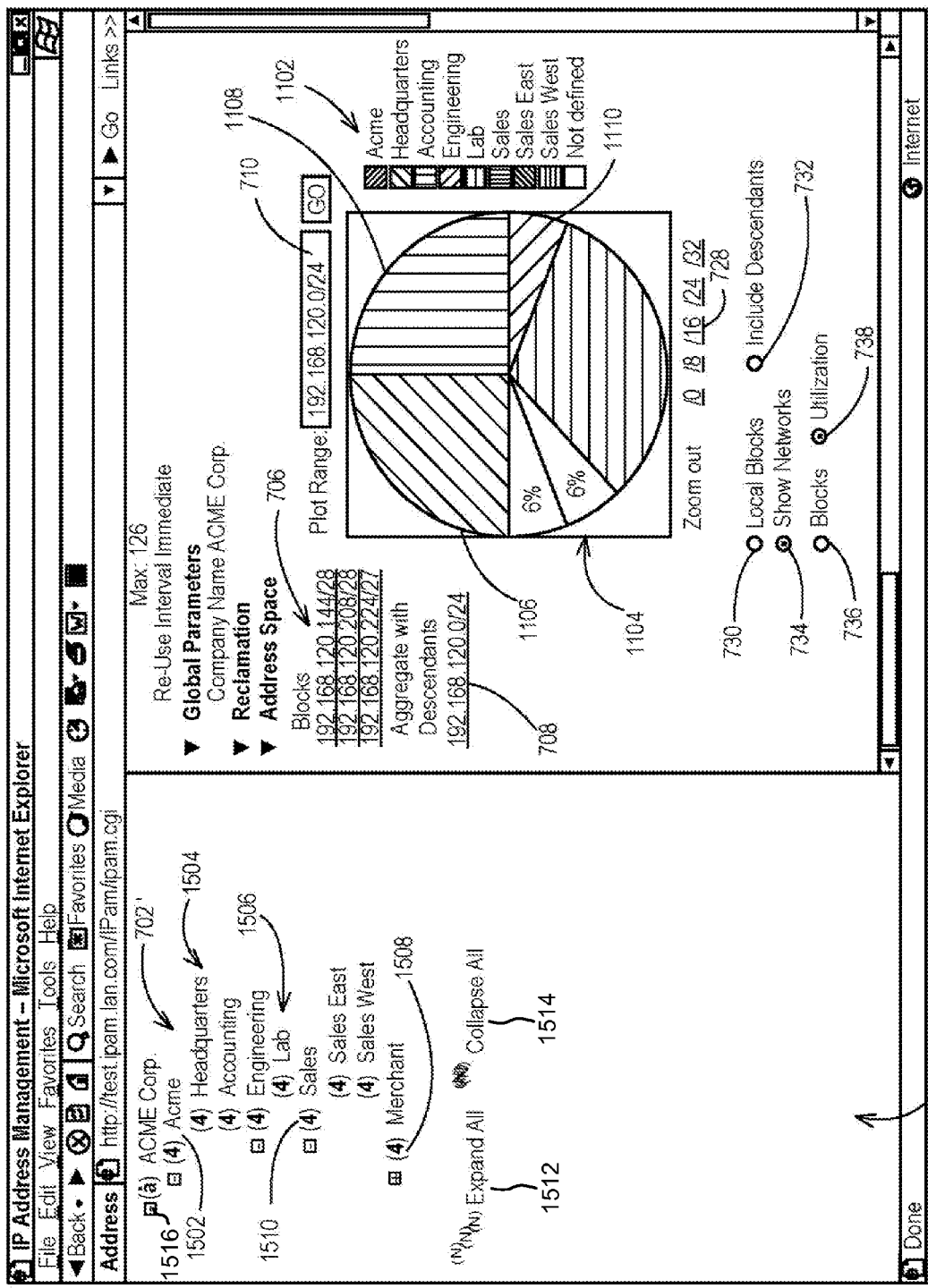
FIG. 15 is a screenshot of the displayed range of networking addresses in utilization format for the various networks defined for the chosen network division with a tree structure in expanded form to illustrate the hierarchy of the various networks based on a single addressing format.

The tree display 702' may also provide several visual indicators. For example, a symbol 1508 such as a numeral or letter may be listed beside each network to indicate the networking address format being used by the network. In this example, "4" indicates that IPv4 is being used by the Merchant network. Furthermore, the symbol 1508 may have a particular color to indicate whether it shares address space with its parent network or has separate network space. Alternatively, or in addition to using color for the symbol, an additional symbol 1510 may be provided to indicate that the network aggregates with its parent network. For example, the symbol 1510 is missing from the Lab subordinate network thereby indicating that it does not aggregate with the Engineering network. The tree display 702' of FIG. 15 is based upon the text listing shown as Table 1.

Figure 16:
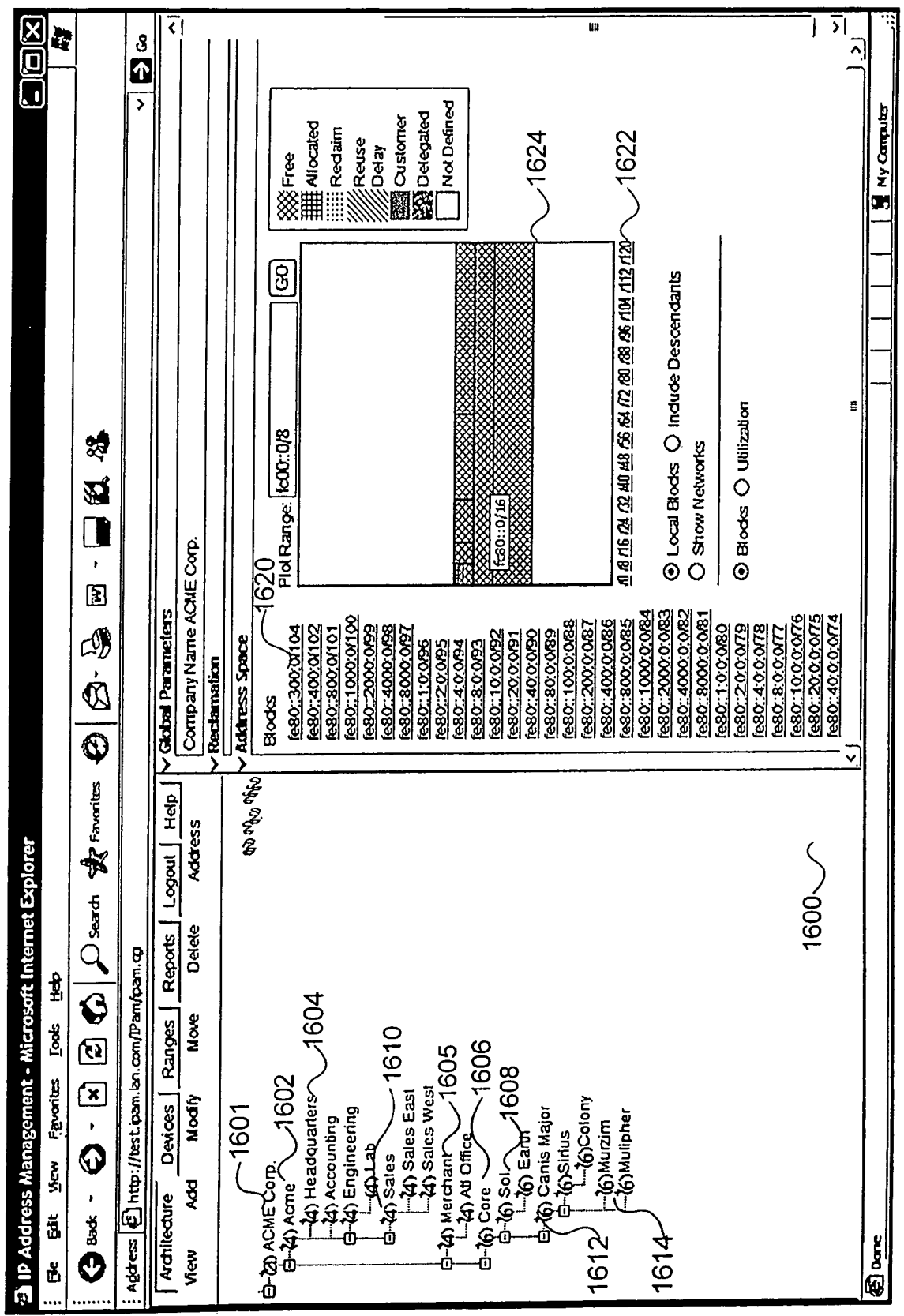
FIG. 16 is a screenshot of a displayed range of networking addresses in blocks format for the chosen network division with a tree structure in expanded form to illustrate the hierarchy of the various networks based on multiple addressing formats.

FIG. 16 is a screenshot 1600 that provides a more complex tree 1601 that includes multiple types of IP addressing being used within the ACME Corp. network space. A spreadsheet listing, providing the definitional information for the networks of the more complex example of FIG. 16 is shown as Table 2 in FIG. 27. The listing of Table 2 corresponds to the network space available for display. In FIG. 16, the list 1620 of links for the blocks includes those that are shown as well as additional ones that are not shown because they are located off the displayed page. Those blocks displayed in the list 1620 and the additional ones not shown account for the address space to be displayed within the map based on the selection of the Core network. Table 2 has been truncated to show those blocks viewable in the list 1620 but omits the additional blocks only for purposes of illustration.

As shown in FIG. 16, the tree 1601 includes the features discussed above in relation to FIG. 15. The network name 1602 is specified along with names of subordinate networks 1604 upon expanding the root network 1602 to reveal the subordinates. A network 1606 that is selected by a user for display within the map 1624 is highlighted to indicate the user has selected this network. Additionally, the subordinates 1608 may be revealed for the root network 1606. As shown in FIG. 16, the network hierarchy may be such that certain networks utilize one network addressing format while other networks use a different network addressing format. In the example shown, the ACME Corp. addressing space has an Acme root 1602 whose subordinates utilize IPv4, a Merchant root 1605 whose subordinates also utilize IPv4, and a Core root 1606 whose subordinates utilize IPv6. The network addressing format indicator 1612 provides a "6" indicating the use of IPv6. Additionally, the format indicator 1612 may be provided in one color versus another to indicate that the network aggregates with its parent, and/or a symbol 1614 may be provided to show that the network aggregates with its parent to account for those users not able to distinguish color.

Also shown in FIG. 16, the list 1620 of blocks for the chosen network Core is displayed along side the map 1624 showing the local blocks. Because Core is an IPv6 network, the addresses are 128 bits rather than only 32 bits as for IPv4. Accordingly, there are zoom-out selections 1622 ranging from /0 to /128 for this IPv6 space.

Table 3, shown in FIG. 28 provides an example of a table used when building the tree structure and map displays that includes an association of network names to IDs, lists the parent ID, the address type, whether the network aggregates, the local address blocks of the network, and the associated status of each set of blocks. In this example of table 3, the tree structure is included to demonstrate the relationship between the tree structure with icon, expand/collapse control, and network name relative to the information of the table that is used when building the tree.

Figure 17:
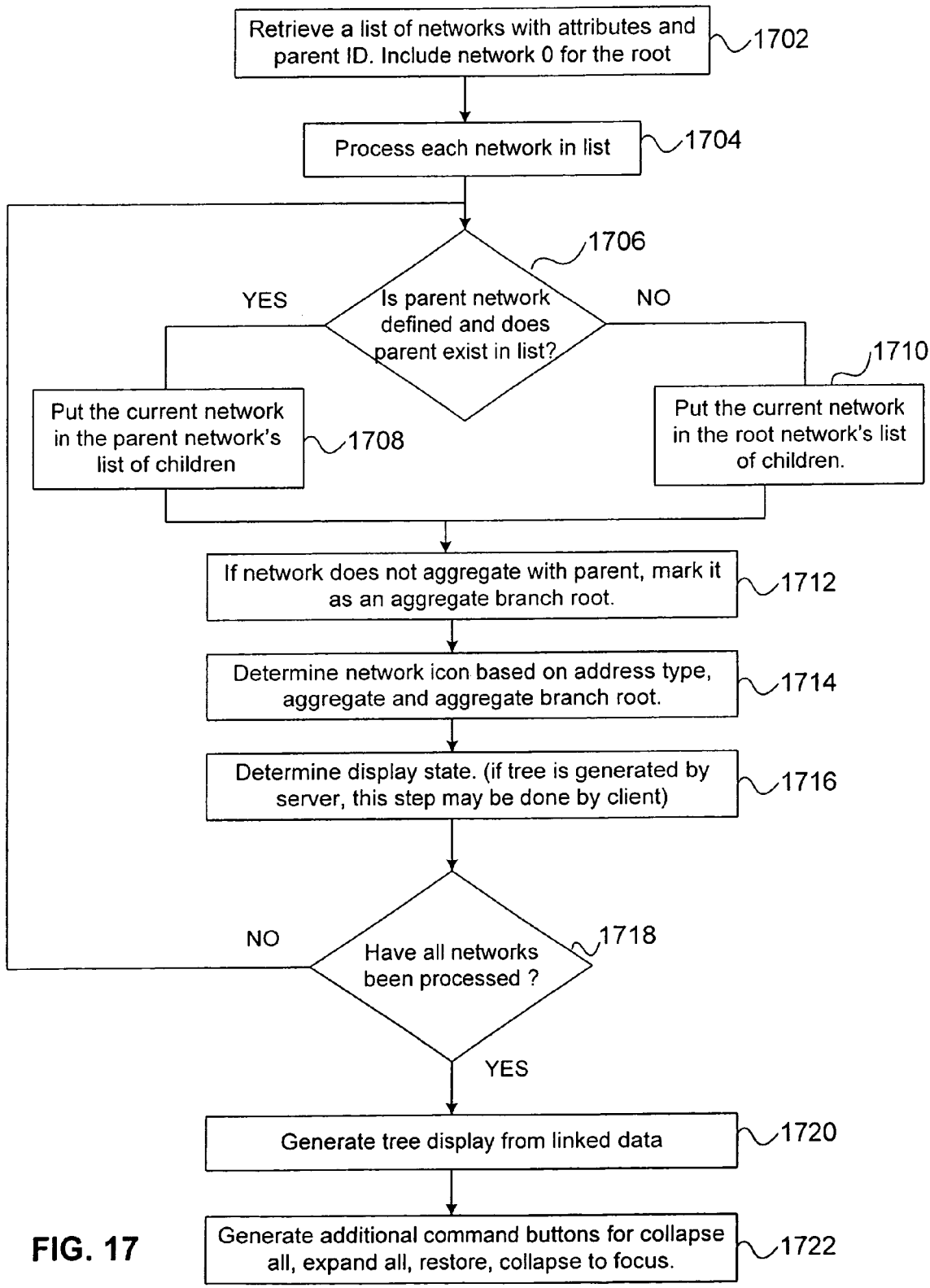
FIG. 17 illustrates a set of logical operations for rendering a display of a tree structure of networking addresses.

FIG. 17 shows logical operations of one embodiment for rendering the tree display for networking address space such as those trees shown in FIGS. 7-16, 18, and 19. The logical operations begin at retrieve operation 1702, upon a user initiating the display of the tree such as by starting the application as noted at display operation 202 of FIG. 2, to access the definitional information of the list for the networking address space including the root network and all others subordinate to it. When retrieving this information, the name, attributes and parent ID is found for each network. As shown in Tables 1 and 2, and in an alternative Table 3, for each network, the list includes the name and also the "type" attribute such as IPv4 or IPv6, as well as the parent ID in Table 3, which is associated with the name of the parent network for the current network (e.g., Sales has a parent network named Acme).

When retrieving the information at retrieve operation 1702, this operation may allow for various permissions on a per user basis. For example, certain users may not be given permission to see all networks that are available. For each user, a list of permissible networks may be maintained. When fetching the networks for display in the tree, each network fetched from the listing is compared to the permissible networks for the current user to determine whether to display the network that has been fetched. If the user has permission to see the current network being fetched, then this network is added to the list being built for the current user. Otherwise, the current network is not added to the list.

Upon building the list at retrieve operation 1702, the processing of each network in the list begins at process operation 1704 to build a list that is a linked structure that may be used by one of many well-known tree rendering methods. The processing first detects whether there is a parent for the current network being considered at query operation 1706. This is detected by referring to the table to see if the parent attribute for the current network lists a name/ID of a parent network. If so, then the current network is added to the list of children of the linked structure for the parent network named for the current network at list operation 1708. If not, then the current network is added to the list of children of the linked structure for the root of the address space at list operation 1710.

Upon adding the information of the current network to the linked structure, the current network is marked within the linked structure either as aggregating with a parent, if that is the case, or as an aggregate branch root at marking operation 1712 again by referring to information from the table. An aggregate branch root is any network meeting any one of the following conditions. It has no parent, it is configured as "not aggregate," or it is not the same address type as its parent.

Figure 19:
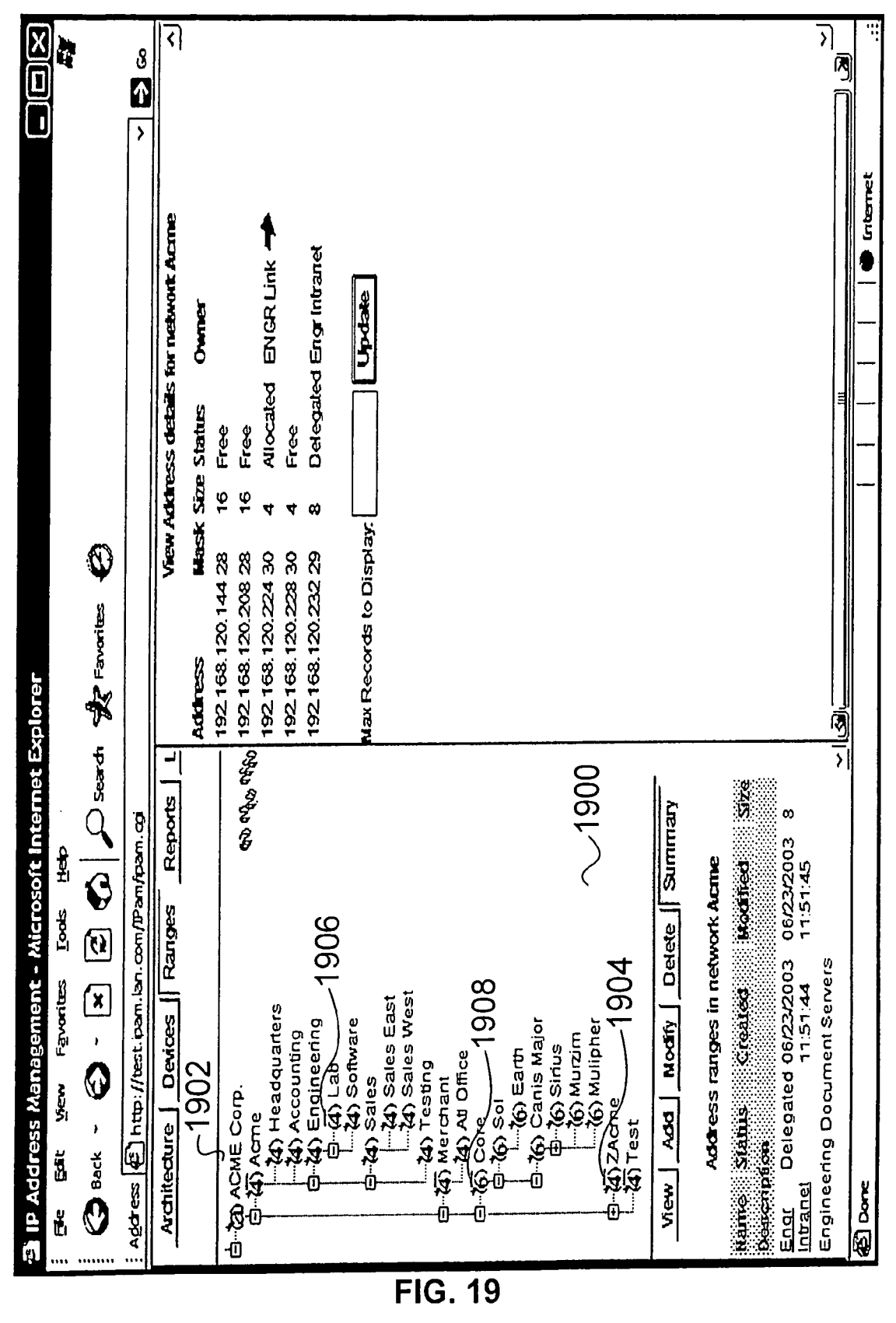

Then, the network icon to display for the current network within the tree is determined at icon operation 1714, where the type attribute is considered to determine whether an icon with a "4" is displayed for an IPv4 type, "6" for IPv6, or other character for other types such as an "a" for ASN type branches. The aggregate attribute of the current network is also considered to determine whether the icon with a "+" and/or with a particular color is displayed based on whether the current network aggregates with its parent, if any. Also, the icon may be based on whether the network is an aggregate branch root as previously determined. FIG. 19 shows an example screenshot 1900 that shows a tree providing branch root icons. The screenshot 1900 includes a tree 1902 that lists several networks with associated icons. Icon 1904 for ZAcme and icon 1906 for Lab show that both of these networks are aggregate branch roots of ACME Corp. In this example, ZAcme is an aggregate branch root since it has no parent, and Lab is an aggregate branch root since it does not aggregate. While ZAcme and Lab or IPv4 networks, Core is an IPv6 network that is a branch aggregate root as indicated by icon 1908.

After finding the proper icon to include in the linked structure for the current network, then the display state for the current network is determined at state operation 1716. This step may be done by the client computer even for embodiments that utilize the processing of a server to produce the tree display. This involves reading a cookie stored on the client computer, a session variable, or other manner of recording whether this particular branch of the tree being displayed is currently expanded or collapsed. The state of the branch of the tree may be affected by multiple stored values.

Query operation 1718 then detects whether all networks have been processed to include them in the linked structure. If not, then operational flow returns to query operation 1706 to determine whether the next network of the list has a parent network defined for it that exists in the list. If so, then operational flow transitions to display operation 1720, where the tree is displayed according to the linked data for the tree using the names and icons that have been previously determined for each level of the tree and also based on the current state of the tree (i.e., branches expanded/collapsed) as determined at state operation 1716. Display operation 1720 may utilize any of the commercially available and well-known tree rendering algorithms.

Additional buttons may then be displayed for "collapse all", "expand all", "restore", and others such as "collapse to focus" at button operation 1722. These buttons are associated with tree functions to change the display state as detected at state operation 1716. "Collapse all" collapses all levels of the tree so that only the root is displayed. "Expand all" expands all levels such that all levels of the tree is displayed. "Restore" returns the tree to a previously displayed state by reversing a previous "expand all" or "collapse function." "Collapse to focus" expands the path from the root to the current network but collapses all others. Within the linked structure being displayed, there is also the individual expand/collapse controls for each individual level of the tree. Accordingly, the tree structure may be displayed as controlled by a user selecting the controls for expanding and collapsing.

The user may select a network of the tree that is to be displayed in the map by clicking on a network displayed within the tree. The network ID of that which is clicked is found within the definitional listing of the networks, such as shown in Tables 1 and 2, to obtain the information to include in the map once a network has been chosen from the tree. Accordingly, the user may expand and collapse within the tree as desired to display the networks of interest. Upon finding a network of interest within the tree, the user may then click on the network within the tree to cause the map to display the address space for the selected network.

Several enhancements may be provided to the displays of the map of network address space discussed above. These enhancements are discussed below in relation to FIGS. 20-25. As shown in FIG. 20, screenshot 2000 includes a tree 2002 and a block mode map 2004. The block mode map includes the local blocks as listed in block list 2006. Descendants from aggregate block list 2008 are not included since the include descendants option ("descendants" as shown) has not been selected. The map 2004 includes grid lines 2010 and rulers 2012 for both axes. A menu includes checkbox 2014 for selecting grid lines 2010, checkbox 2016 for selecting rulers, and checkbox 2018 for selecting crosshairs, which are discussed in more detail below with reference to FIG. 24. A mask size drop down menu 2028 as discussed above in relation to FIG. 18 is also included to allow the plot range to be controlled to zoom in or out.

In addition to these menu selections, the screenshot 2000 provides other inputs for plot range control. For example, an active region control 2020 provides a selection to enable the user to focus the map to the plot range showing the address space assigned for the chosen network from the tree. For example, the user may have entered a plot range causing the map 2004 to display address space that is not assigned to the chosen network of the tree or is not at the proper zoom level to show the complete address space assigned to the chosen network. Clicking the active region control 2020 then changes the plot range such that the map 2004 displays the network space of the chosen network, where the active region that is being displayed is the smallest CIDR block that contains all blocks in the selected block list.

Figure 21:
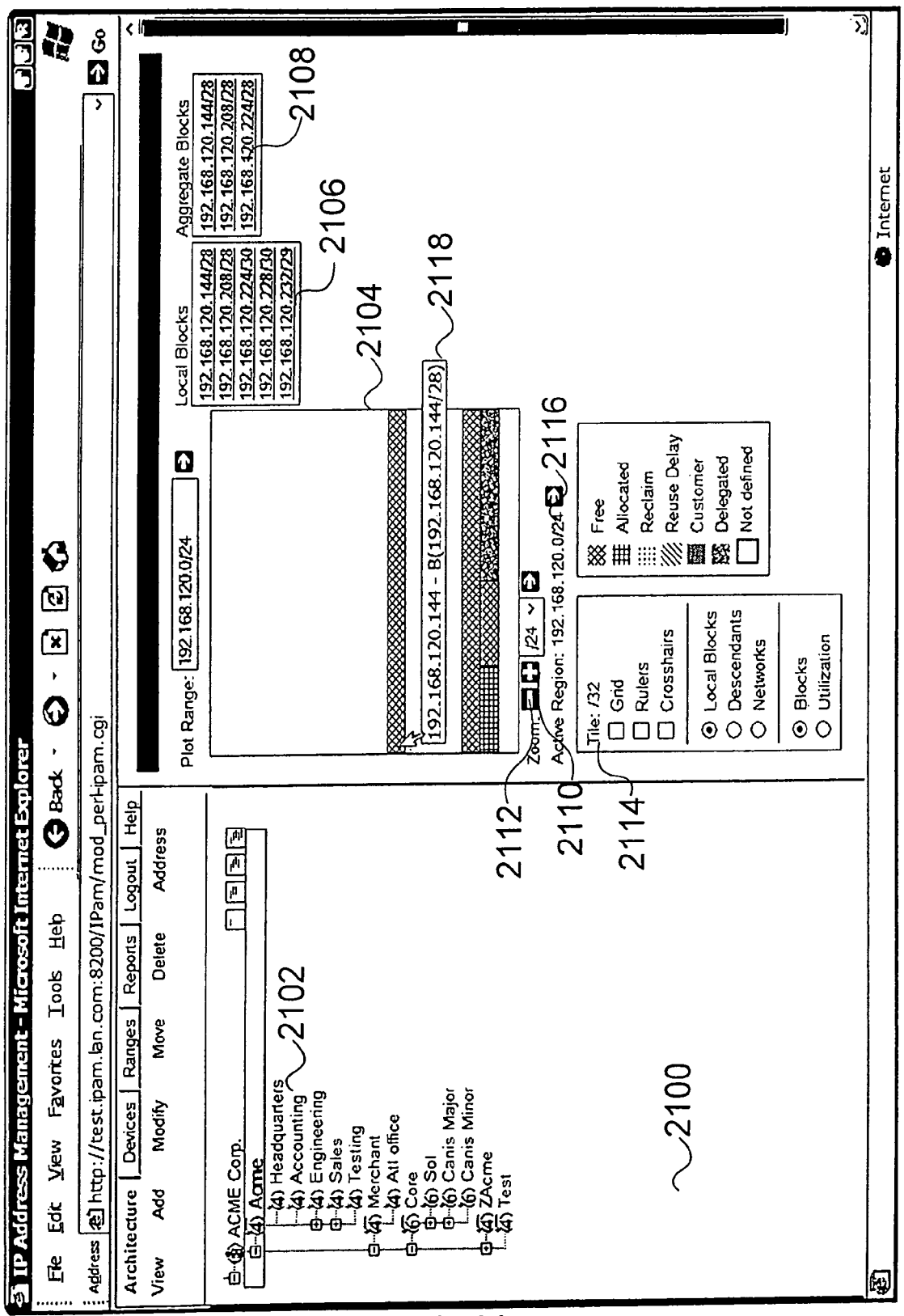
FIG. 21 is a screenshot of a displayed range of network addresses in block format with enhanced menu options and with enhanced tool tips.

FIG. 21 provides a screenshot 2100 that includes a tree 2102 and a block mode map 2104. The block mode map 2104 includes the local blocks as listed in block list 2106. Descendants from aggregate block list 2108 again are not included since the include descendants option has not been selected. The map 2104 lacks grid lines and rulers since the user has not selected those options. A menu includes checkboxes for the various options that the user may select and also provides an indicator 2114 of the size of each major grid square by indicating the mask size.

In this example, the mouse is hovering over a block on the map which results in the tip box 2118 being displayed. In this example, the tip box 2118 is enhanced to provide the address for the major grid square the mouse is hovering over and also specify the block by listing the start address and mask size. Accordingly, a user can quickly see the relevant addresses of a block and also see the block definition in the tip box 2118.

The user can control the address space being displayed within the map 2104 by using the various navigational controls, including the active region control 2116 as well as zoom in and out buttons 2110, 2112. The zoom in and out buttons 2110, 2112 allow the user to zoom in and out by one zoom increment at a time. For example, the zoom increment may be on a byte boundary. Alternatively, the zoom increment may be configured to be based on other values of $2^n$ rather than byte boundaries. Map displays that are not based on byte boundaries are discussed below with reference to FIGS. 29-34.

Zoom out control 2112 functions by decreasing the mask of the current plot range by the configured zoom increment, adjusting the address to a valid block that contains the current block. The zoom in control 2110 increases the mask of the current plot range by the configured zoom increment. Each plot range contains multiple smaller ranges of a higher mask, so the new plot range for a zoom in is selected according to a focus block selected by previous user selections or by default to one of the defined blocks.

Figure 22:
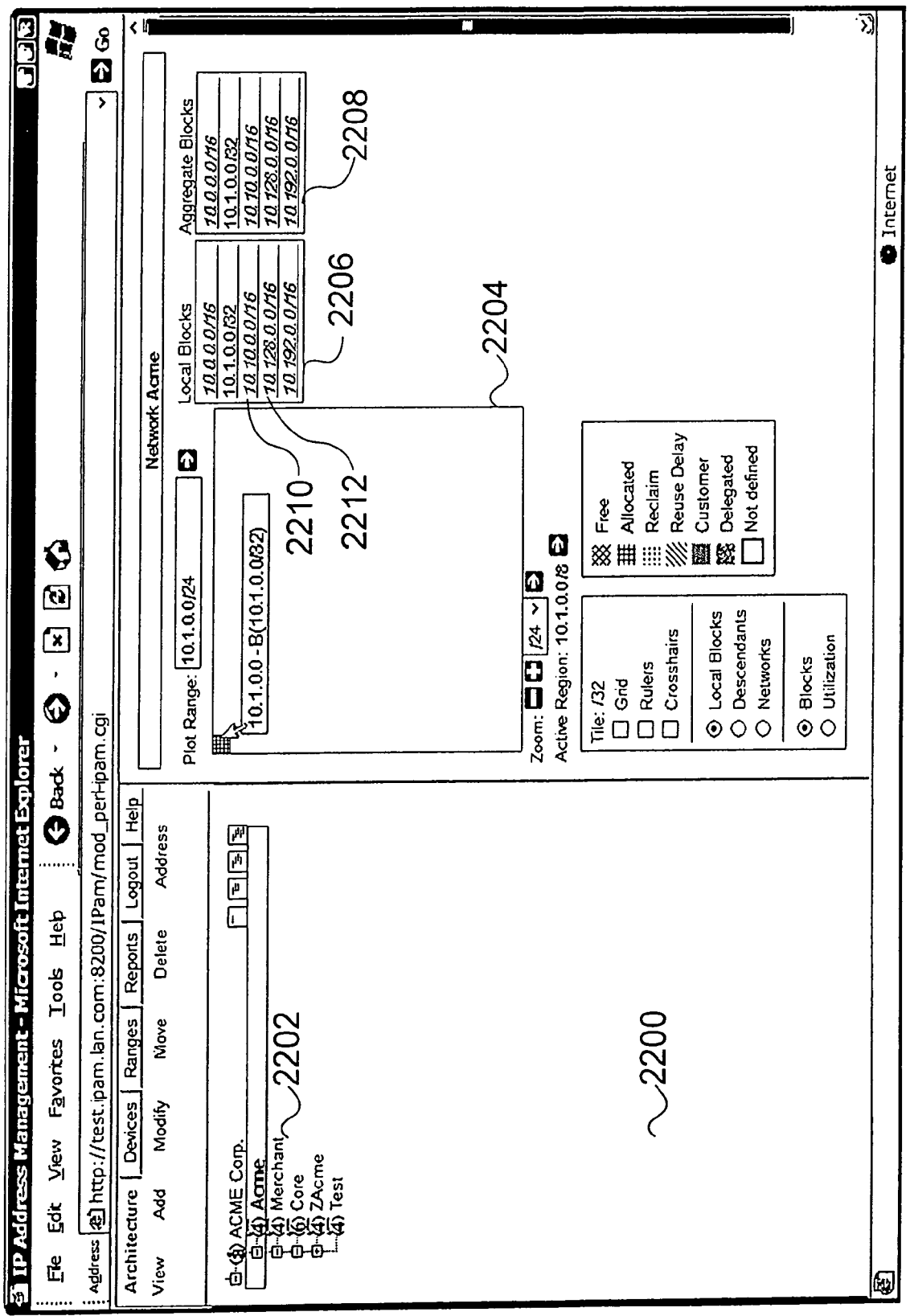
FIG. 22 is a screenshot of a displayed range of network addresses in block format with enhanced menu options and tool tips and with the legend representing only those networks that are found within the plot range.

FIG. 22 shows a screenshot 2200 including a network tree 2202 and map 2204 and that also provides an additional enhancement. In this screenshot 2200, the block lists 2206 and 2208 are enhanced to provide an indication of those blocks that are viewable in the currently displayed map 2204. As shown, the visual indication is a italicized typeface 2210 for those blocks shown in the display, while those blocks not shown in the display are shown in non-italicized typeface 2212. Accordingly, a user can quickly determine which blocks of the block lists 2206 and 2208 are included in the map being displayed. Adjusting the zoom level and/or plot range can vary which blocks are included in the displayed map, so as the map changes based on user input, the visual indication of the block list changes accordingly.

As shown in FIG. 22, the block list 2206 includes the list of blocks defined in the selected network, i.e., the "local blocks." Block list 2208 includes the list of aggregate blocks in the local network disregarding the status or distinct allocations of the individual blocks. The blocks are listed with the additional visual indicator, e.g., italicized typeface, for blocks that are contained within the current plot range and are therefore included in the map display. The "descendant" and "network" display modes, which are not selected for the example of FIG. 22, use the combined blocks from the current network and its descendant networks. In such an example of "descendant" or "network" display modes, such as shown in FIG. 23, the block lists are updated so that the local blocks list includes the list of distinct blocks of the blocks in the current and descendant networks while the aggregate block list includes the aggregate blocks of all blocks in the current and descendant networks, disregarding status, the owning network, or individual allocations.

Figure 23:
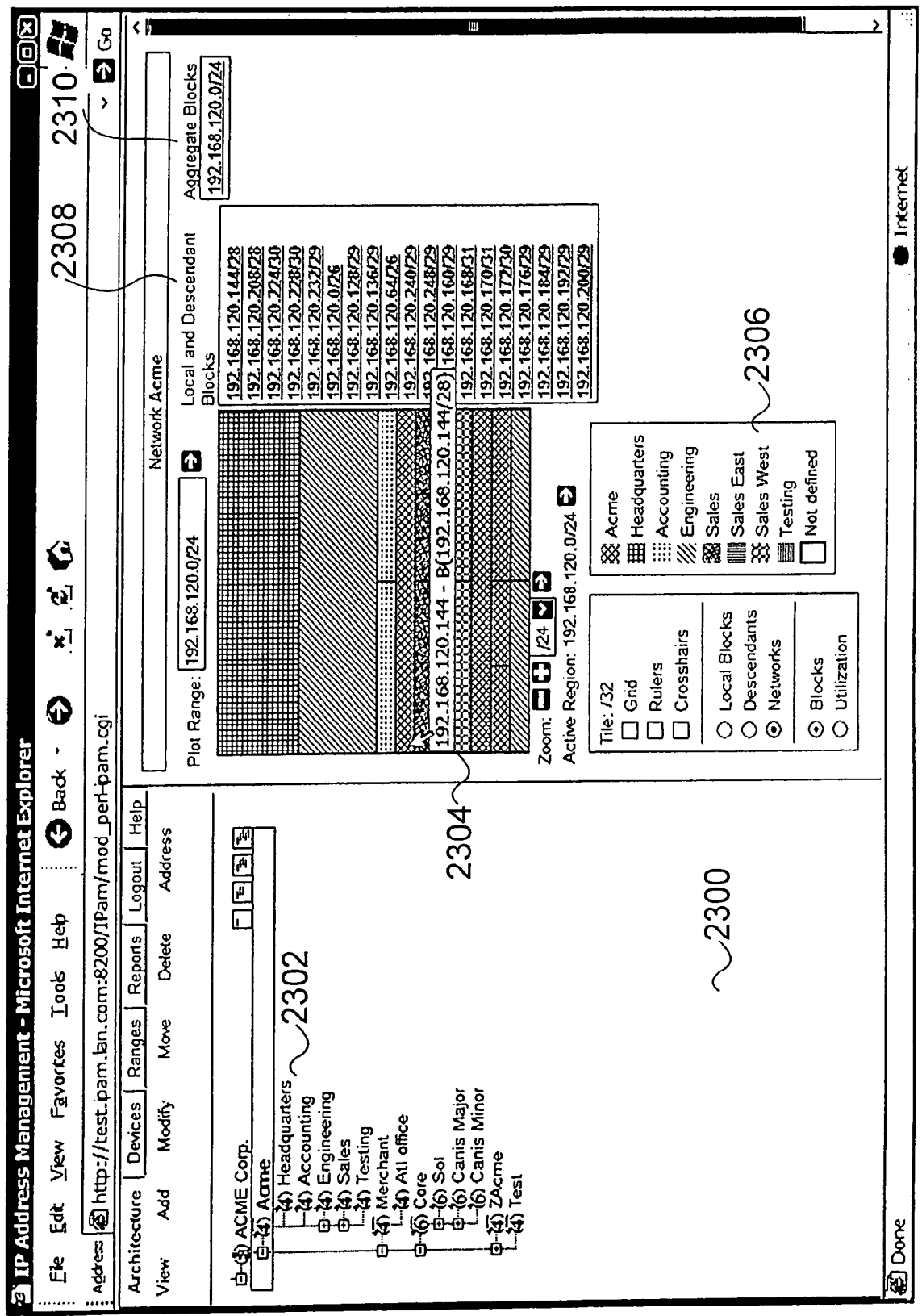
FIG. 23 is a screenshot of a displayed range of network addresses in block format with enhanced menu options and also including enhanced block lists to illustrate those blocks appearing in the current plot range.

FIG. 23 shows a screenshot 2300 that includes a network tree 2302 and a block mode map 2304 showing networks including the chosen network from the tree 2302 and any aggregate networks. Block list 2308 shows the individual local and descendant blocks of the map 2304 while block list 2310 shows the aggregate block being displayed. This example differs from the example of FIG. 8 in that the legend 2306 lacks any non-aggregate networks subordinate to the chosen network since the non-aggregate networks are not included in the map display 2304 for the chosen network Acme. In this example, the Lab network is subordinate to the Engineering network, which is subordinate to the chosen Acme network, but Lab does not aggregate with the parent Engineering network. Therefore, Lab is not included in the legend 2306 since Lab does not contribute to the map 2304.

Figure 24:
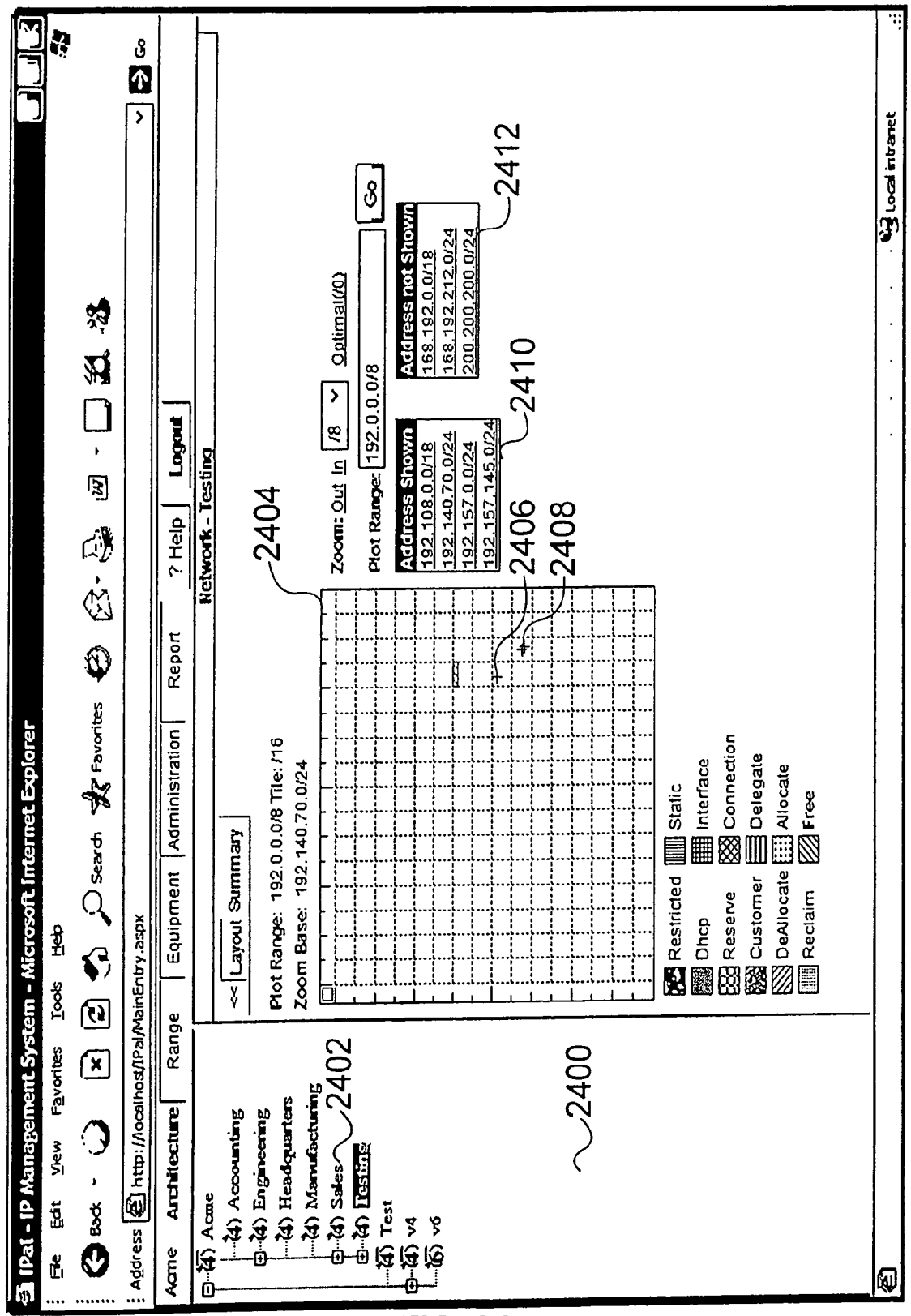
FIG. 24 is a screenshot of a displayed range of network addresses in block format with crosshairs enabled as a visual indicator for undersized blocks present in the grid square.

FIG. 24 shows a screenshot 2400 that includes a network tree 2402 and a block mode map 2404. In this example, to assist the user, a first block list 2410 is included to show those blocks that are assigned to the chosen network and that are within the plot range such that they are within the map 2404. A second block list 2412 is included to show those blocks that are assigned to the chosen network and that are not within the plot range and are not within the map 2404.

The block mode map 2404 has crosshairs enable so that undersized blocks covered by the plot range are indicated within the map 2404 by single crosshair 2406 or double crosshair 2408. Single crosshairs 2406 indicate that there is a single block of additional information to be viewed by zooming in on the address space while double crosshairs 2408 indicate that there are multiple blocks of additional information to be viewed. The logical operations for including single or double crosshairs is discussed below with reference to FIG. 35.

Figure 35:
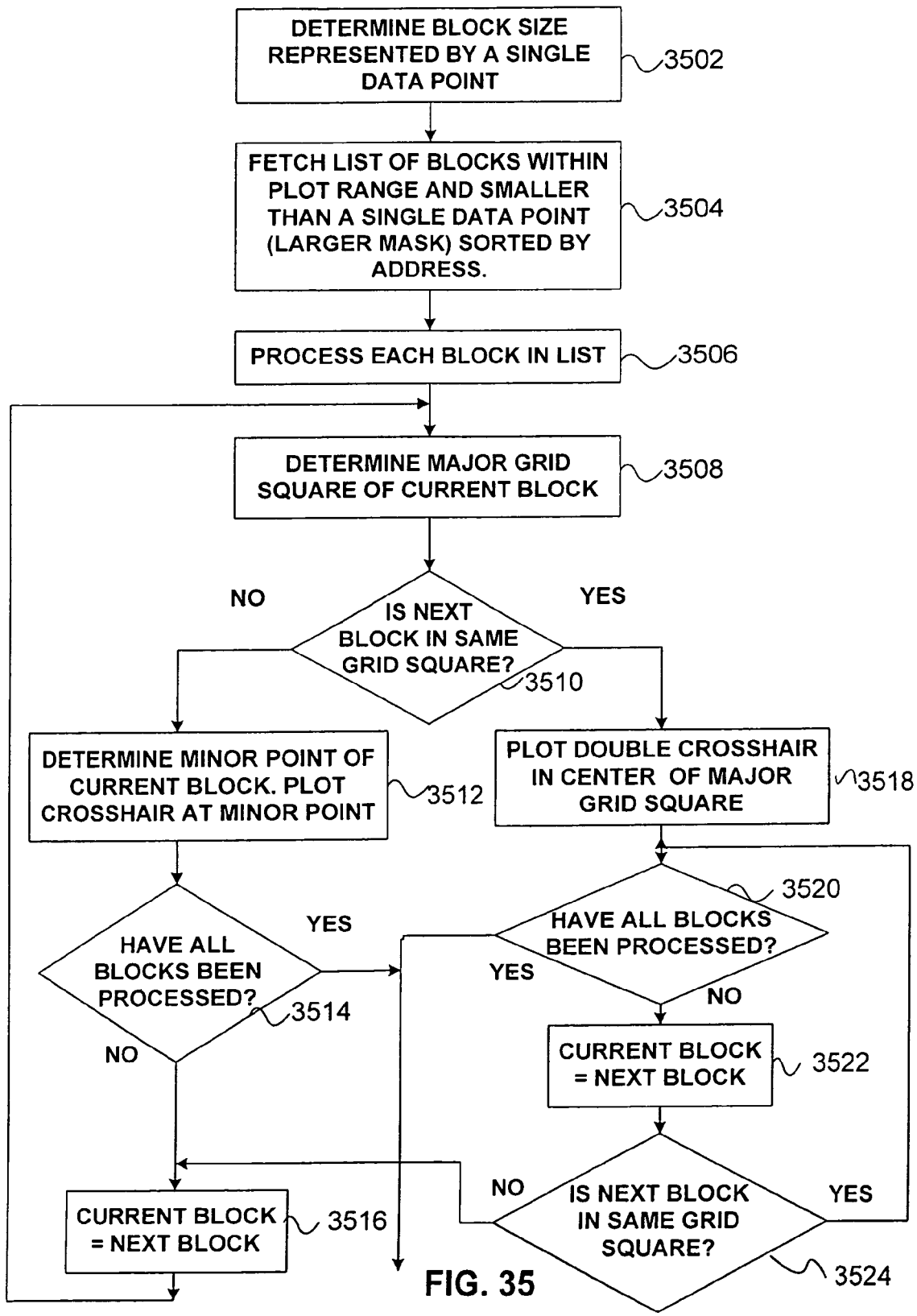
FIG. 35 a set of logical operations performed when rendering displays of networking addresses where undersized blocks are indicated by single or double crosshairs within the map display.

The logical operations of FIG. 35 add the single and double crosshairs to the map, as necessary, upon the user selecting the crosshairs option, or alternatively by default. These operations may be performed after those of FIG. 5 have completed rendering the map such that the crosshairs are drawn atop the map that has been rendered. The logical operations of FIG. 35 begin at block size operation 3502, where it is determined what block size is represented by a single data point, i.e., a point within the minor grid space. For example, where second and third bytes of IPv4 space are being displayed, then each data point of the minor grid space represents a /24 space. Then, at fetch operation 3504, a list of blocks within the current plot range is fetched from the definitional listing of address space such as Tables 1, 2, or 3 for only those blocks having a size smaller than the size represented by a single data point (i.e., those with a larger mask). In the example above, those blocks with a mask larger than /24 would be included in the list. As an alternative, those blocks having the same size as the size represented by the single data point may also be added to the list, such that in the example above those with a mask of /24 or greater would be included. The list of blocks is created in an order sorted by address, e.g., from lowest to highest.

Upon fetching the blocks to create the list, processing of each of the blocks in the list begins at process operation 3506. The processing begins by determining the major grid square of the current block being processed at major grid operation 3508, which is the first block of the sorted order on the first iteration. This determination is made as discussed above in relation to FIG. 5 where the row and column position within the major grid space is found for a particular block. Once this major grid space is found, it is detected whether the next block in the list is in the same major grid square at query operation 3510. If not, then the data point within the minor grid space of the major grid space is found at minor grid operation 3512 as discussed above in relation to FIG. 5 where the row and column position within the minor grid space is found for a particular block, and a single crosshair is drawn on the map at this minor grid point.

After drawing in the crosshair on the map, query operation 3514 detects whether all blocks of the list have been processed. If so, then the logical operations end. If not, then the next block in the list becomes the current block to be considered at block operation 3516 and operational flow returns to major grid operation 3508 to determine the major grid space for the current block.

Back at query operation 3510, where it is detected that the next block is in the same major grid space as the current block, then double crosshairs are drawn within the center of the major grid space on the map at major grid operation 3518. This double crosshair indicates that there are multiple blocks within the minor points of this major grid space. Query operation 3520 then detects whether all blocks of the list have been processed. If so, then the logical operations are done. If not, then the next block in the list becomes the current block to be considered at block operation 3522. Query operation 3524 then detects whether the next block after the current block in the list is also in the same major grid square. Since double crosshairs already indicate multiple blocks at the minor point, then there is no need to add additional crosshairs to the major grid square so operational flow returns to query operation 3520 in the next block is in the same major grid square. Upon query operation 3524 detecting that a next block is not in the same major grid square, then the next block becomes the current block to be considered at block operation 3516.

Figure 25:
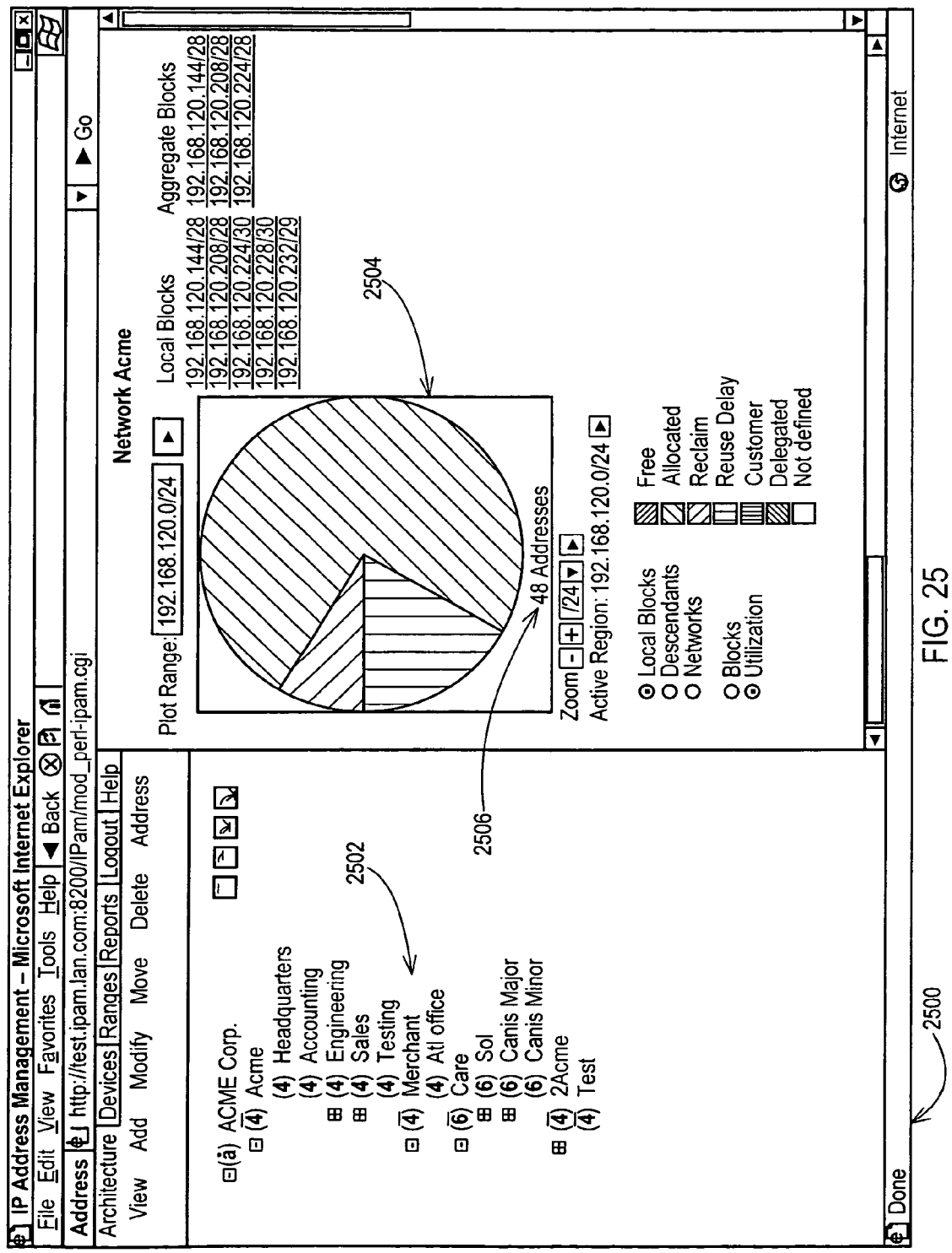
FIG. 25 is a screenshot of a displayed range of network addresses in utilization mode with a visual display of the total number of blocks of addresses present in the selected plot range.

FIG. 25 shows a screenshot 2500 that includes a network tree 2502 and a utilization mode map 2504. The utilization mode map 2504 is enhanced to include an indication 2506 of the total number of blocks of addresses represented by the utilization map 2504.

As discussed above, a user may select that the block mode map display a plot range that does not fall on a byte boundary. FIGS. 29-34 show various examples of grids that may be used to render a map of address space not falling on a byte boundary. In each example, the start address of each major grid square, which is noted by an offset from the start address of the grid space is included to show how the address space is divided among the major grid squares of the major grid space. As noted for each of the three examples, when the plot range does not fall on a byte boundary, there are two approaches to generating a block mode map.

FIG. 29 shows an example of a grid system for the block mode map where the plot range falls on a byte boundary plus two bits. FIG. 29 shows one approach where the major grid space is 8×8 rather than 16×16 for the mask that is a byte plus two bits. Each major grid space is representative of the mask for the plot range plus six bits. So, for example, where the mask is a /10 (i.e., an /8 plus 2), each major grid space represents a /16.

FIG. 30 shows another approach for a grid system for the block mode map where the plot range falls on a byte boundary plus two bits. This grid system retains the 16×16 major grid. Each major grid space is representative of the mask plus eight bits. So, for example, where the mask is a /10, each major grid space represents a /18.

FIG. 31 shows an example of a grid system for the block mode map where the plot range falls on a byte boundary plus four bits. FIG. 31 shows one approach where the major grid space is 4×4 rather than 16×16 for the mask that is a byte plus four bits. Each major grid space is representative of the mask for the plot range plus four bits. So, for example, where the mask is a /12 (i.e., an /8 plus 4), each major grid space represents a /16.

FIG. 32 shows another approach for a grid system for the block mode map where the plot range falls on a byte boundary plus four bits. This grid system retains the 16×16 major grid.

Each major grid space is representative of the mask plus eight bits. So, for example, where the mask is a /12, each major grid space represents a /20.

Figure 33:
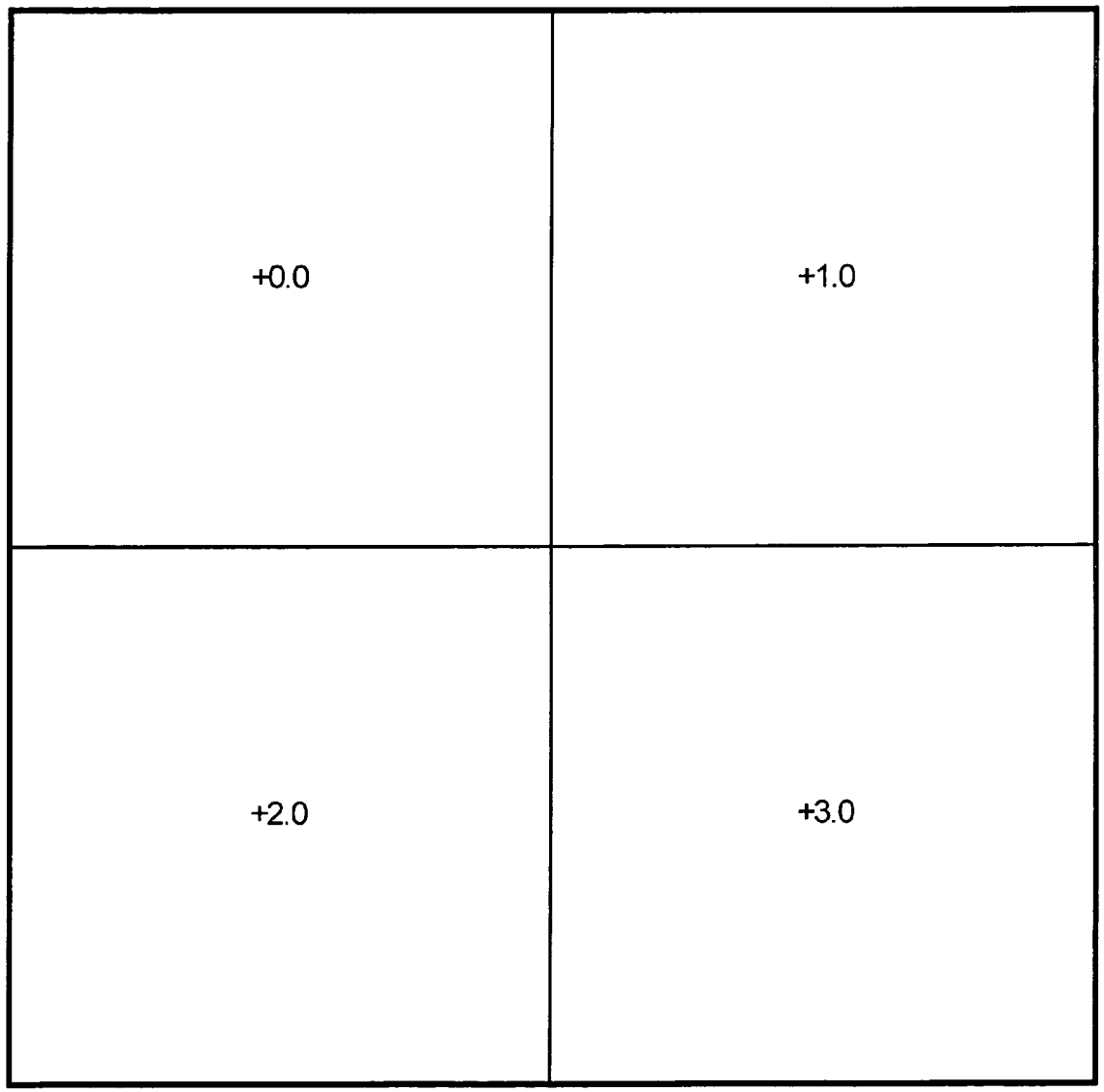
FIG. 33 shows a first example of a two-dimensional grid system for rendering displays of networking addresses where the plot range is not defined along a byte boundary but is instead defined along a byte+6 bits.

FIG. 33 shows an example of a grid system for the block mode map where the plot range falls on a byte boundary plus six bits. FIG. 33 shows one approach where the major grid space is 2×2 rather than 16×16 for the mask that is a byte plus six bits. Each major grid space is representative of the mask for the plot range plus two bits. So, for example, where the mask is a /14 (i.e., an /8 plus 6), each major grid space represents a /16.

FIG. 34 shows another approach for a grid system for the block mode map where the plot range falls on a byte boundary plus six bits. This grid system retains the 16×16 major grid. Each major grid space is representative of the mask plus eight bits. So, for example, where the mask is a /14, each major grid space represents a /22.

As discussed above, various embodiments provide visual displays of networking address space. The visual information allows the layout of the space and/or its utilization to be quickly determined. Accordingly, these embodiments may be utilized when designing and maintaining networks to improve the efficiency of the design process and the operation of the networks. While the embodiments above are discussed in relation to IPv4 networking addressing, it will be appreciated that the discussion in relation to IPv4 is for purposes of illustration only and that these embodiments may be used in conjunction with networks using ASN, IPv6, or other networking addressing schemes.

The screen displays and logical operations for receiving user input and creating network address displays including tree structures and map displays have been discussed in the context of CIDR format IP address space for purposes of illustration only. Therefore, it will be appreciated that embodiments of the present invention are operable in the context of other networking address types as well, such as but not limited to telephone numbers, MAC values, serial numbers, and others.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of illustrating user-defined blocks of networking addresses, comprising:

accessing definitional information of a block of networking addresses, the definitional information comprising a user-defined start address, a user-defined mask size, and one or more attributes for the networking addresses of the block; and rendering, based on the user-defined start address and the user-defined mask size, a display of the block of networking addresses in a map depicting an associated address space, wherein the display provides a first visual indicator for networking addresses having a first value of a first attribute and a second visual indicator for networking addresses having a second value of the first attribute, and wherein the map depicting the associated address space comprises a grid space representing the associated address space and at least one rectangle is rendered within the grid space to represent the block of networking addresses with the at least one rectangle being provided with the first visual indicator.

2. The computer-implemented method of claim 1, wherein the display is rendered in the map at a location determined by a relative position of the user-defined start address within the associated address space and of a size determined by the user-defined mask size in relation to the associated address space.

3. The computer-implemented method of claim 1, wherein determining the associated address space of the map comprises receiving a user selection to zoom out of a current displayed map depicting the associated address space to display a map of an address space containing a larger number of addresses.

4. The computer-implemented method of claim 1, wherein determining the associated address space of the map comprises receiving a user selection to zoom in on a current displayed block of networking addresses.

5. The computer-implemented method of claim 1, wherein a second rectangle is rendered within the grid space to represent a second block of networking addresses with the second rectangle being provided with the first visual indicator.

6. The computer-implemented method of claim 1, wherein a second rectangle is rendered within the grid space to represent a second block of networking addresses with the second rectangle being provided with the second visual indicator.

7. The computer implemented method of claim 1, wherein the at least one rectangle is provided with the second visual indicator in addition to the first visual indicator.

8. The computer-implemented method of claim 1, wherein an area of the at least one rectangle is representative of a number of networking addresses within the block.

9. The computer-implemented method of claim 1, wherein the definitional information further comprises user-defined hierarchical relationships between the block of networking addresses and one or more subordinate blocks of networking addresses, and wherein rendering the display comprises rendering a display for each of the subordinate blocks of networking addresses related to the block of networking addresses.

10. A computer readable storage medium containing instructions that when performed by a computer, cause the computer to:

access definitional information for a plurality of user-defined blocks of networking addresses, the definitional information comprising a user-defined start address, a user-defined mask size, and an attribute for the networking addresses of each of the plurality of user-defined blocks; and render a display for each of the plurality of user-defined blocks of networking addresses in a map depicting an associated address space, wherein the display comprises a shape rendered in the map at a location determined by a relative position of the user-defined start address within the associated address space and of a size determined by the user-defined mask size in relation to the associated address space, and wherein the map depicting the associated address space comprises a grid space representing the associated address space and a rectangle is displayed within the grid space to represent each of the plurality of user-defined blocks of networking addresses.

11. The computer-readable medium of claim 10, wherein the display further comprises a first visual indicator for networking addresses having a first value of the attribute and a second visual indicator for networking addresses having a second value for the attribute.

12. A computer-implemented method of illustrating user-defined networking address structure, comprising:

accessing definitional information of a plurality of blocks of networking addresses, the definitional information comprising a user-defined start address and a user-defined mask size for each of the plurality of blocks, and a user-defined hierarchical relationship between a parent network and at least one subordinate network having an association with one or more of the plurality of blocks of networking addresses;

rendering a display of the parent network and at least one subordinate network, wherein the display is a tree illustrating the user-defined hierarchical relationship between the parent and subordinate networks;

receiving a user selection of one of the parent or subordinate networks from the display; and upon receiving a user selection of a network, rendering a display for each of the plurality of blocks of networking addresses associated with the selected network in a map depicting an address space, wherein the address space is associated with the selected network, and wherein the map depicting the address space comprises a grid space representing the address space and the display comprises a rectangle rendered in the grid space at a location determined by a relative position of the user-defined start address of the block within the address space and of a size determined by the user-defined mask size of the block in relation to the address space.

13. The computer-implemented method of claim 12, wherein the tree lists a name assigned to each of the parent and subordinate networks of the hierarchical relationship according to the definitional information.

14. The computer-implemented method of claim 12, wherein the tree provides an indicator of a type of networking addresses contained in the one or more of the plurality of blocks associated with the parent and subordinate networks according to the definitional information.

15. The computer-implemented method of claim 12, wherein the tree provides an indicator of whether the subordinate networks are aggregated with the parent network according to the definitional information.

16. The computer-implemented method of claim 12, wherein the tree further provides selections for expanding and collapsing the display of the subordinate networks related to a parent network.

* * * * *